US011601990B2

(12) United States Patent
Aramoto et al.

(10) Patent No.: US 11,601,990 B2
(45) Date of Patent: Mar. 7, 2023

(54) UE AND COMMUNICATION METHOD THEREFOR

(71) Applicants: SHARP KABUSHIKI KAISHA, Sakai (JP); FG Innovation Company Limited, Tuen Mun (HK)

(72) Inventors: Masafumi Aramoto, Sakai (JP); Tsuyoshi Takakura, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 14 days.

(21) Appl. No.: 17/054,765

(22) PCT Filed: May 9, 2019

(86) PCT No.: PCT/JP2019/018645
§ 371 (c)(1),
(2) Date: Nov. 11, 2020

(87) PCT Pub. No.: WO2019/216391
PCT Pub. Date: Nov. 14, 2019

(65) Prior Publication Data
US 2021/0251020 A1 Aug. 12, 2021

(30) Foreign Application Priority Data
May 11, 2018 (JP) .............................. JP2018-092185

(51) Int. Cl.
*H04W 76/10* (2018.01)
*H04W 76/25* (2018.01)
(Continued)

(52) U.S. Cl.
CPC ....... *H04W 76/10* (2018.02); *H04W 28/0289* (2013.01); *H04W 76/25* (2018.02); *H04W 84/042* (2013.01)

(58) Field of Classification Search
CPC ............. H04W 76/10; H04W 28/0289; H04W 76/25; H04W 84/042; H04W 36/22;
(Continued)

(56) References Cited

U.S. PATENT DOCUMENTS

2019/0029065 A1* 1/2019 Park ........................ H04W 8/02
2019/0335392 A1* 10/2019 Qiao ..................... H04W 48/18
(Continued)

OTHER PUBLICATIONS

MCC Support, "System Architecture for the 5G System; Stage 2 (Release 15)", 3GPP, Dec. 15, 2017, SP-170931 (Year: 2017).*
(Continued)

*Primary Examiner* — Michael K Phillips
(74) *Attorney, Agent, or Firm* — ScienBiziP, P.C.

(57) ABSTRACT

A User Equipment (UE) includes: a transmitter configured to transmit, in a case that a timer is running for a piece of Single Network Slice Selection Assistance Information (S-NSSAI) at a time when a Public Land Mobile Network (PLMN) is changed, a Protocol Data Unit (PDU) session establishment request message for an identical piece of S-NSSAI in a changed PLMN without stopping the timer. This configuration allows for provision of a communication control method for the terminal to apply congestion managements expected by the network to the congestion managements applied by the network in 5G congestion management to which multiple congestion managements are applied.

2 Claims, 12 Drawing Sheets

(51) Int. Cl.
*H04W 28/02* (2009.01)
*H04W 84/04* (2009.01)

(58) Field of Classification Search
CPC ........... H04W 28/0846; H04W 36/385; H04W 28/0284; H04W 76/12; H04W 36/14; H04W 48/18
See application file for complete search history.

(56) References Cited

U.S. PATENT DOCUMENTS

| | | | | |
|---|---|---|---|---|
| 2020/0037386 | A1* | 1/2020 | Park | H04W 48/17 |
| 2020/0178196 | A1* | 6/2020 | Wang | H04W 48/18 |
| 2020/0304983 | A1* | 9/2020 | Zhu | H04L 41/0893 |
| 2020/0336937 | A1* | 10/2020 | Youn | H04W 76/18 |
| 2021/0029628 | A1* | 1/2021 | Kim | H04W 48/18 |
| 2021/0112513 | A1* | 4/2021 | Chun | H04W 48/18 |
| 2021/0360519 | A1* | 11/2021 | Ramle | H04L 41/082 |

OTHER PUBLICATIONS

Sharp:"Congestion control for SM Alt1", 3GPP Draft; C1-180248_Congestion_Control_DNNANDSNSSAI_ALT1, 3rd Generation Partnership Project (3GPP), Mobile Competence Centre; 650, Route Des Lucioles; F-06921 Sophia-Antipolis Cedex; France, vol. CT WG1, No. Gothenburg (Sweden); 2Jan. 22, 2018-Jan. 26, 2018 Jan. 15, 2018 (Jan. 15, 2018), XP051383340.

Ericsson:"Idle and connected state terminology cleanup", 3GPP Draft; 23501_CR0050_5GS_PH1_(REL-15)_S2-181617_WAS0104_CR-23501_Terminology, 3rd Generation Partnership Project (3GPP), Mobile Competence Centre; 650, Route Des Lucioles; F-06921 Sophia-Antipol, vol. SA WG2, No. Montreal, Canada; Feb. 26, 2018-Mar. 2, 2018 Mar. 19, 2018 (Mar. 19, 2018), XP051411256.
Sharp:"Congestion control upon PLMN change", 3GPP Draft; C1-183759_CONGESTIONCONTROLPLMN_R3, 3rd Generation Partnership Project (3GPP), Mobile Competence Centre; 650, Route Des Lucioles; F-06921 Sophia-Antipolis Cedex; France, vol. CT WG1, No. Osaka (Japan); May 21, 2018-May 25, 2018 May 28, 2018 (May 28, 2018), XP051459823.
Ericsson, Samsung, Congestion control[online], 3GPP TSG SA WG2 #124, S2-179300, Dec. 4, 2017.
Vivo, Handling of S-NSSAI based congestion control[online], 3GPP TSG CT WG1 #107, C1-174813, Nov. 20, 2017.
Sharp, Congestion control for SM Alt1[online], 3GPP TSG CT WG1 #108, C1-180248, Jan. 26, 2018.
Ericsson, "Slice co-existence", SA WG2 Meeting #122 Jun. 26-30, 2017 San Jose, Mexico, S2-175271.
3GPP TS 23.501, "3rd Generation Partnership Project; Technical Specification Group Services and System Aspects; System Architecture for the 5G System; Stage2 (Release 15)", Technical Specification, V15.0.0 (Dec. 2017).
3GPP TS 23.502, "3rd Generation Partnership Project; Technical Specification Group Services and System Aspects; Procedures for the 5G System; Stage 2 (Release 15)", Technical Specification, V15 0.0 (Dec. 2017).

* cited by examiner

UE AND COMMUNICATION METHOD THEREFOR

TECHNICAL FIELD

The present application relates to a UE and a communication method for the UE. This application claims priority based on JP 2018-092185 filed on May 11, 2018 in Japan, the contents of which are incorporated herein in its entirety by reference.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE). The 3GPP is in the process of standardizing Evolved Packet System (EPS) as a communication system for realizing an all-Internet Protocol (IP) architecture. Note that a core network constituting the EPS is called an Evolved Packet Core (EPC).

Additionally, the 3GPP recently has been studying a next-generation communication technology and a system architecture for 5th Generation (5G) mobile communication system which is a next-generation mobile communication system. Especially, as a system for achieving the 5G mobile communication system, the 3GPP is in a process of standardizing 5G System (5GS) (see NPL 1 and NPL 2). In the 5GS, technical problems attributable to connection of various terminals to a cellular network are extracted to standardize solutions.

For example, requirement conditions include optimization and diversification of a communication procedure for supporting a continual mobile communication service depending on a terminal supporting various access networks, optimization of a system architecture suitable for the optimization and diversification of the communication procedure, and the like.

CITATION LIST

Non Patent Literature

NPL 1: 3GPP TS 23.501 v15.0.0; 3rd Generation Partnership Project; Technical Specification Group Services and System Aspects; System Architecture for the 5G System; Stage 2 (Release 15)

NPL 2: 3GPP TS 23.502 v15.0.0; 3rd Generation Partnership Project; Technical Specification Group Services and System Aspects; Procedures for the 5G System; Stage 2 (Release 15)

SUMMARY OF INVENTION

Technical Problem

In 5GS, in addition to a system for providing a function corresponding to congestion management in the EPS, congestion management in Network Slice is also being studied (see NPL 1 and NPL 2).

However, in a rejection response to a terminal-initiated session management request in a state in which a network simultaneously applies congestion management corresponding to the congestion management in the EPS and the congestion management targeting the network slice, processing as to how the network indicates applied congestion management for a terminal apparatus or how a terminal apparatus that has received the rejection response applies and identifies congestion management that the network expects has not yet been made clear. Alternatively, in a case that the terminal apparatus receives a network-initiated session management request in a state in which the terminal apparatus runs a timer for congestion management associated with multiple congestion managements, processing of identifying the timer for the congestion managements being a target of the session management request has not yet been made clear. Alternatively, in a case that Public Land Mobile Network (PLMN) change occurs in application of the identified congestion management, processing of application of the congestion management in the change destination PLMN has not yet been made clear.

The present invention is made in the light of the circumstances as described above, and has an object to provide a system and a communication control method for implementing management processing such as congestion management for each network slice.

Solution to Problem

A User Equipment (UE; terminal apparatus) according to one embodiment of the present invention includes: a transmitter configured to transmit, in a case that a timer is running for a piece of Single Network Slice Selection Assistance Information (S-NSSAI) at a time when a Public Land Mobile Network (PLMN) is changed, a Protocol Data Unit (PDU) session establishment request message for an identical piece of S-NSSAI in a changed PLMN without stopping the timer.

Further, a communication method performed by a User Equipment (UE; terminal apparatus) according to one embodiment of the present invention includes: transmitting, in a case that a timer is running for a piece of Single Network Slice Selection Assistance Information (S-NSSAI) at a time when a Public Land Mobile Network (PLMN) is changed, a Protocol Data Unit (PDU) session establishment request message for an identical piece of S-NSSAI in a changed PLMN without stopping the timer.

Advantageous Effects of Invention

According to the present invention, a terminal apparatus configuring 5GS and an apparatus in a core network can perform management processing such as congestion management for each network slice and/or DNN or APN as initiated by the terminal apparatus and the network.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. SYSTEM OVERVIEW

Figure 1:
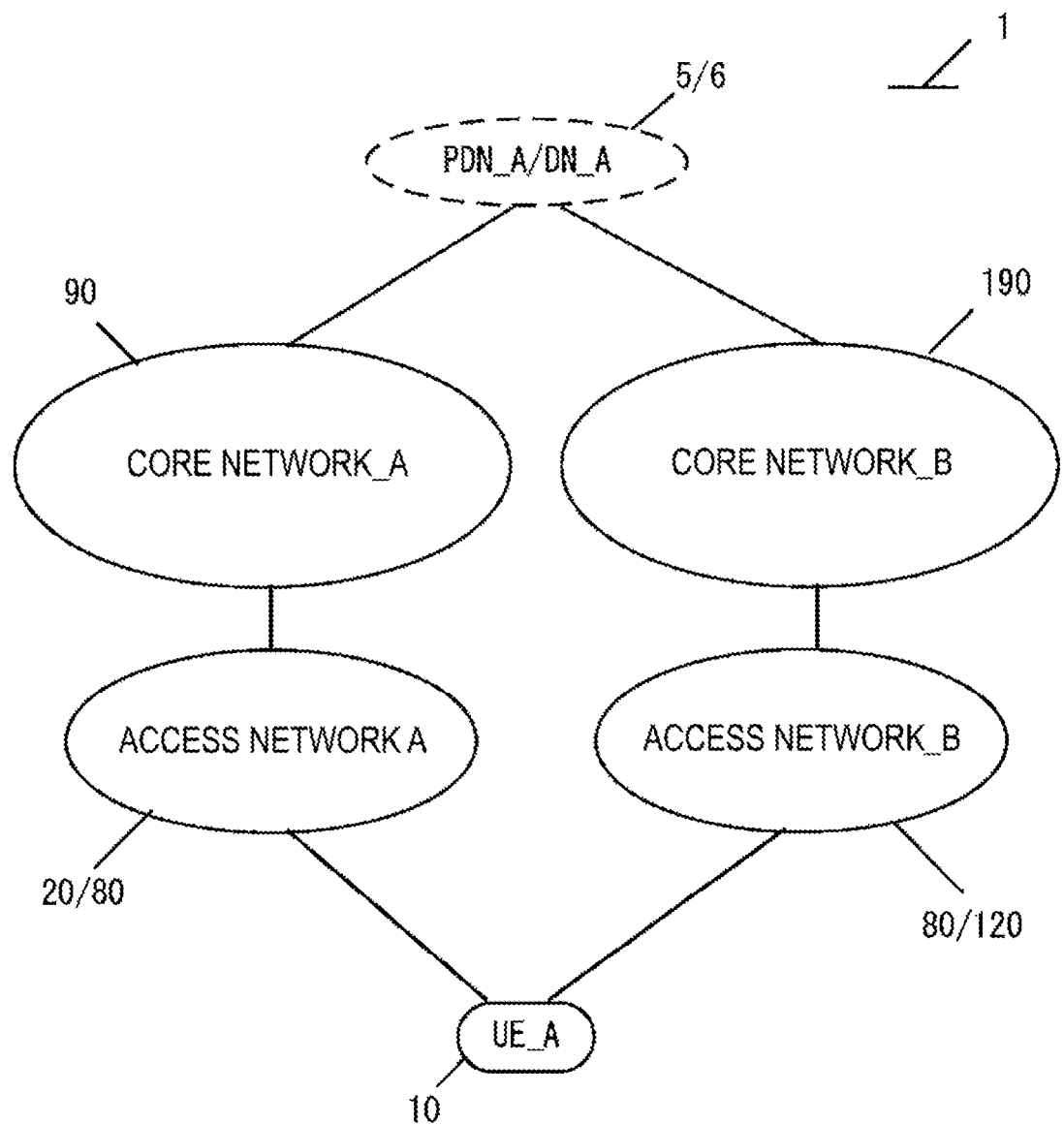
FIG. 1 is a diagram illustrating an overview of a mobile communication system.
Figure 2:
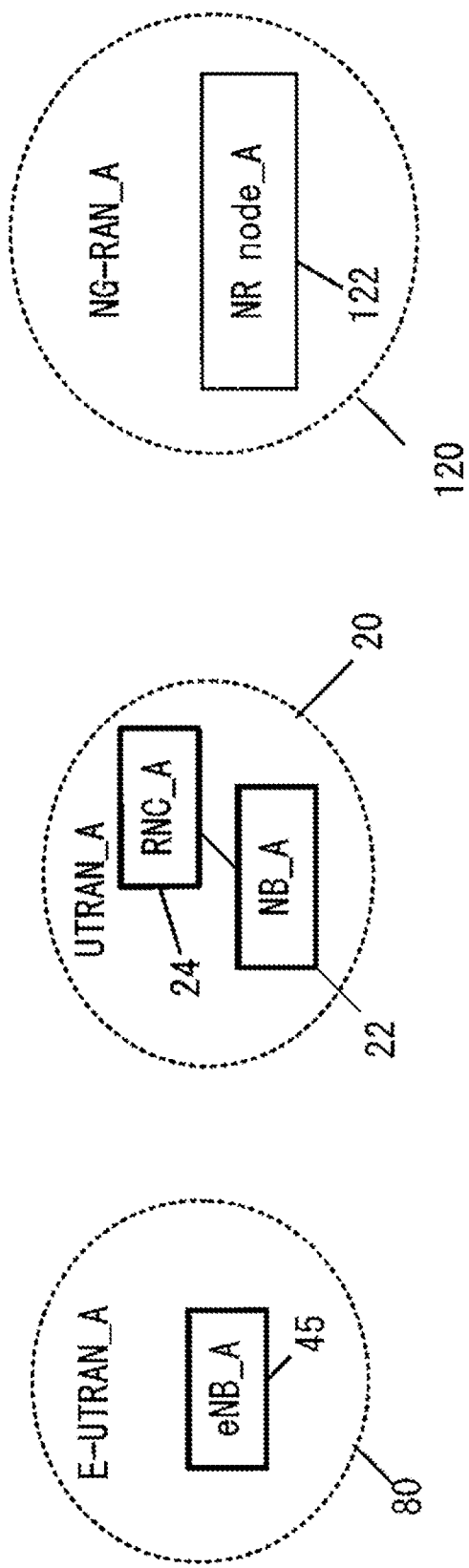
FIG. 2 is a diagram illustrating an example of a configuration and the like of access networks in the mobile communication system.
Figure 3:
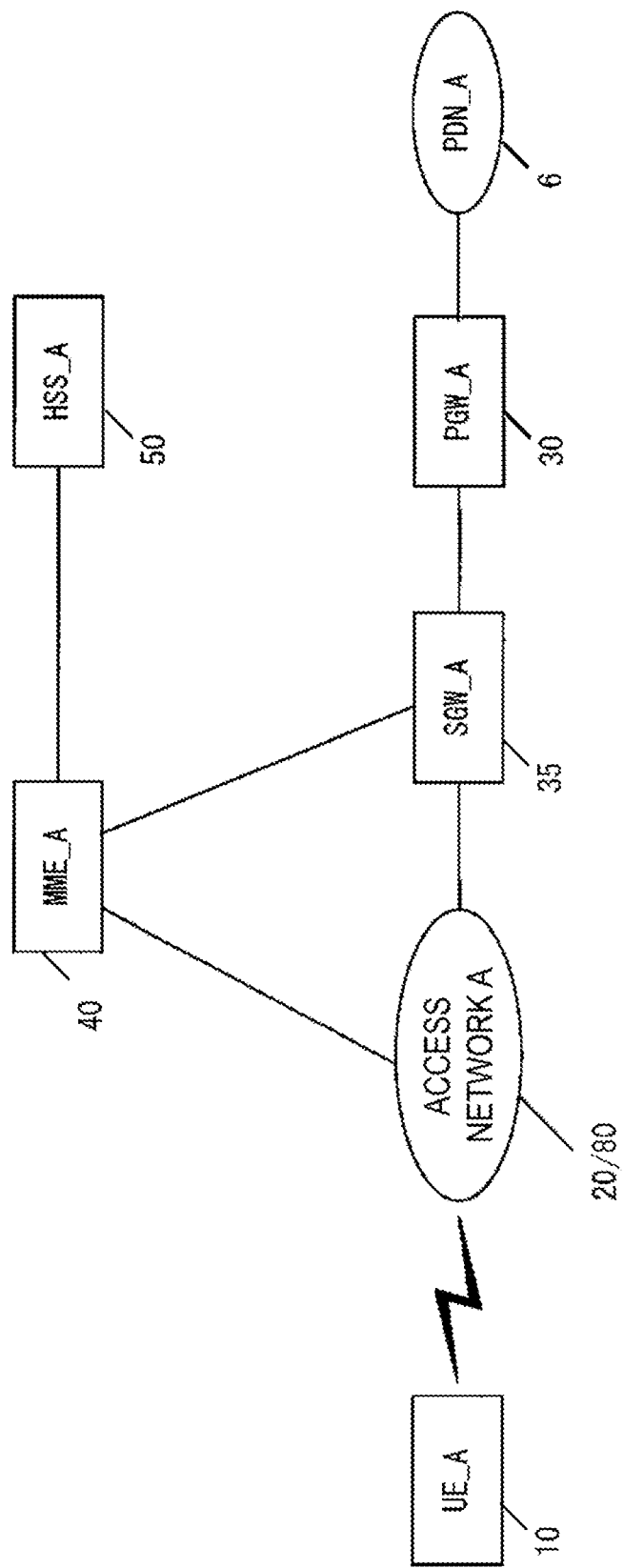
FIG. 3 is a diagram illustrating an example of a configuration or the like of a core network_A in the mobile communication system.
Figure 4:
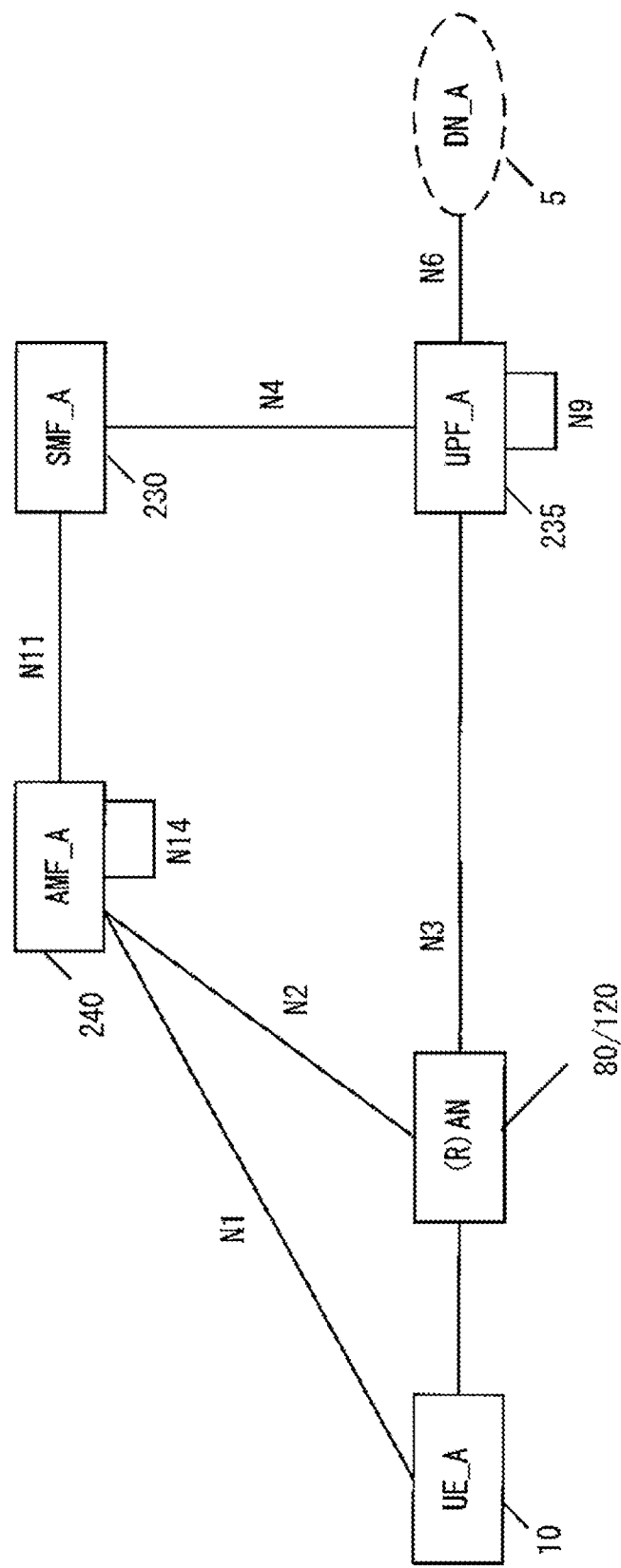
FIG. 4 is a diagram illustrating an example of a configuration or the like of a core network_B in the mobile communication system.

An overview of a mobile communication system according to the present embodiment will be described with reference to FIG. 1, FIG. 2, FIG. 3, and FIG. 4. FIG. 2 is a diagram for detailing access networks of the mobile communication system of FIG. 1. FIG. 3 is a diagram mainly illustrating details of a core network_A 90 in the mobile communication system of FIG. 1. FIG. 4 is a diagram mainly illustrating details of a core network_B 190 in the mobile communication system of FIG. 1. As illustrated in FIG. 1, a mobile communication system 1 according to the present embodiment includes a terminal apparatus (also referred to as a user equipment or a mobile terminal apparatus) User Equipment (UE)_A 10, an Access Network (AN)_A, an access network_B, a Core Network (CN)_A 90, a core network_B 190, a Packet Data Network (PDN)_A 6, and a Data Network (DN)_A 5. Note that a combination of the access network_A and the core network_A 90 may be referred to as an Evolved Packet System (EPS; 4G mobile communication system), a combination of the access network_B, the core network_B 190, and the UE_A 10 may be referred to as a 5G System (5GS; 5G mobile communication system), and a configuration of the 5GS and the EPS need not be limited to these. Note that, for the sake of simplicity, the core network_A 90, the core network_B, or a combination thereof may also be referred to as a core network, and the access network_A, the access network_B, or a combination thereof may also be referred to as an access network or a radio access network, and the DN_A 5, the PDN_A 6, or a combination thereof may also be referred to as a DN.

Here, the UE_A 10 may be an apparatus that can connect to a network service via 3GPP access (also referred to as 3GPP access or a 3GPP access network) and/or non-3GPP access (also referred to as non-3GPP access or a non-3GPP access network). In addition, the UE_A 10 may also include a Universal Integrated Circuit Card (UICC) and an embedded UICC (eUICC). Furthermore, the UE_A 10 may be a wirelessly connectable terminal apparatus and may be Mobile Equipment (ME), a Mobile Station (MS), a Cellular Internet of Things (CIoT) terminal (CIoT UE), or the like.

In addition, the UE_A 10 can be connected to an access network and/or core network. In addition, the UE_A 10 can be connected to the DN_A and/or the PDN_A via the access network and/or the core network. The UE_A 10 transmits and/or receives (communicates) user data with the DN_A and/or the PDN_A by using a Protocol Data Unit or Packet Data Unit (PDU) session and/or Packet Data Network (PDN) connection (also referred to as PDN connection). Further, the communication of the user data is not limited to Internet Protocol (IP) communication (IPv4 or IPv6), and for example, may be non-IP communication in the EPS, and may be Ethernet (registered trademark) communication or Unstructured communication in the 5GS.

Here, IP communication is data communication using IP, and is data communication achieved by transmitting and/or receiving an IP packet including an IP header. Note that a payload section constituting the IP packet may include the user data transmitted and/or received by the UE_A 10. Furthermore, non-IP communication is data communication without using IP, and is data communication achieved by transmitting and/or receiving data without IP header. For example, the non-IP communication may be the data communication achieved through transmitting and/or receiving application data not given the IP address, or may transmit and/or receive the user data transmitted and/or received by the UE_A 10 to which another header such as a MAC header and an Ethernet (trade name) frame header is given.

Further, the PDU session refers to connectivity established between the UE_A 10 and the DN_A 5 in order to provide PDU connection service. To be more specific, the PDU session may be connectivity established between the UE_A 10 and an external gateway. Here, the external gateway may be a UPF, a Packet Data Network Gateway (PGW), or the like. Furthermore, the PDU session may be a communication path established to transmit and/or receive the user data between the UE_A 10 and the core network and/or the DN, or a communication path established to transmit and/or receive the PDU. Furthermore, the PDU session may be a session established between the UE_A 10 and the core network and/or the DN, or may be a logical communication path including a transfer path such as one or more bearers and the like between apparatuses in the mobile communication system 1. To be more specific, the PDU session may be connection established by the UE_A 10 with the core network_B 190, and/or the external gateway, or may be connection established between the UE_A 10 and the UPF. Furthermore, the PDU session may be connectivity and/or a connection between the UE_A 10 and the UPF_A 235 via an NR node_A 122. Furthermore, the PDU session may be identified by a PDU session ID and/or an EPS bearer ID.

Note that the UE_A 10 can transmit and/or receive the user data to and/or from an apparatus, such as an application server, that is located in the DN_A 5 by using the PDU session. In other words, the PDU session can transfer the user data transmitted and/or received between the UE_A 10 and the apparatus, such as the application server, that is located in the DN_A 5. Further, each apparatus (the UE_A 10, the apparatus in the access network, and/or the apparatus in the core network, and/or the apparatus in the data network) may manage one or more pieces of identification information in association with the PDU session. Note that these pieces of identification information may include at least one of an Access Point Name (APN), a Traffic Flow Template (TFT), a session type, application identification information, identification information of the DN_A 5, Network Slice Instance (NSI) identification information, Dedicated Core Network (DCN) identification information, and access network identification information, or may further include other information. Furthermore, in a case that multiple PDU sessions are established, respective pieces of identification information correlated to the PDU sessions may be the same contents or may be different contents.

Furthermore, the NSI identification information is information for identifying an NSI, and hereinafter may be an NSI ID or a Slice Instance ID.

Further, as the access network_A and the access network_B, as illustrated in FIG. 2, any one of a Universal Terrestrial Radio Access Network (UTRAN)_A 20, an Evolved Universal Terrestrial Radio Access Network (E-UTRAN) A 80, and an NG-RAN (5G-RAN)_A 120 may be used. Note that, in the following, the UTRAN_A 20 and/or the E-UTRAN_A 80 and/or the NG-RAN_A 120 may be referred to as 3GPP access or a 3GPP access network, and a radio LAN access network and a non-3GPP AN may be referred to as non-3GPP access or a non-3GPP access network. Each radio access network includes an apparatus to which the UE_A 10 is actually connected (e.g., a base station apparatus or an access point), and the like.

For example, the E-UTRAN_A 80 is an access network for Long Term Evolution (LTE) and includes one or more eNBs_A 45. The eNB_A 45 is a radio base station to which the UE_A 10 connects through Evolved Universal Terrestrial Radio Access (E-UTRA). Furthermore, in a case that multiple eNBs are present in the E-UTRAN_A 80, the multiple eNBs may be connected to each other.

Further, the NG-RAN_A 120 is an access network of 5G, and may be a (R)AN illustrated in FIG. 4, and includes one or more NR nodes (New Radio Access Technology nodes)_A 122 and/or ng-eNBs. Note that the NR node_A 122 is a radio base station to which the UE_A 10 connects using radio access of 5G (5G Radio Access), and is also referred to as a gNB. Note that the ng-eNB may be an eNB (E-UTRA) configuring an access network of 5G, may be connected to the core network_B 190 via the NR node_A, or may be directly connected to the core network_B 190. Further, in a case that multiple NR nodes_A 122 and/or ng-eNBs are present in the NG-RAN_A 120, the NR nodes_A 122 and/or the ng-eNBs may be connected to each other.

Note that the NG-RAN_A 120 may be an access network configured in the E-UTRA and/or the 5G Radio Access. In other words, the NG-RAN_A 120 may include the eNB_A 45, the NR node_A 122, or both the eNB_A 45 and the NR node_A 122. In this case, the eNB_A 45 and the NR node_A 122 may be similar apparatuses. Therefore, the NR node_A 122 can be substituted with the eNB_A 45.

The UTRAN_A 20 is an access network of 3G mobile communication system, and includes a Radio Network Controller (RNC)_A 24 and a Node B (NB)_A 22. The NB_A 22 is a radio base station to which the UE_A 10 connects through Universal Terrestrial Radio Access (UTRA), and the UTRAN_A 20 may include one or multiple radio base stations. Furthermore, the RNC_A 24 is a controller for connecting the core network_A 90 and the NB_A 22, and the UTRAN_A 20 may include one or multiple RNCs. Moreover, the RNC_A 24 may be connected to one or multiple NBs_A 22.

Note that, in the present specification, the expression "the UE_A 10 is connected to each radio access network" is equivalent to "the UE_A 10 is connected to a base station apparatus, an access point, or the like included in each radio access network," and is equivalent to "transmitted and/or received data, signals, and the like are also transferred through the base station apparatus and the access point." Note that control messages transmitted and/or received between the UE_A 10 and the core network_B 190 may be the same control message, regardless of a type of the access network. Therefore, the expression "the UE_A 10 and the core network_B 190 transmit and/or receive a message to and/or from each other via the NR node_A 122" may be equivalent to "the UE_A 10 and the core network_B 190 transmit a message to each other via the eNB_A 45."

Furthermore, the access network is a radio network connecting with the UE_A 10 and/or the core network. The access network may be a 3GPP access network, or a non-3GPP access network. Note that the 3GPP access network may be the UTRAN_A 20, the E-UTRAN_A 80, or the NG-Radio Access Network (RAN)_A 120, and the non-3GPP access network may be a radio LAN access point (WLAN AN). Note that the UE_A 10 may connect to the access network or to the core network via the access network in order to connect to the core network.

Moreover, the DN_A 5 and the PDN_A 6 are Data Networks that provide communication services to the UE_A 10, may be configured as packet data service networks, and may be configured for each service. Furthermore, the DN_A 5 may include a connected communication terminal. Therefore, connecting with the DN_A 5 may be connecting with the communication terminal or a server device located in the DN_A 5. Furthermore, the transmission and/or reception of the user data to and/or from the DN_A 5 may be transmission and/or reception of the user data to and/or from the communication terminal or server device located in the DN_A 5. Further, although the DN_A 5 is located outside of the core network in FIG. 1, the DN_A 5 may be located inside of the core network.

Furthermore, the core network_A 90 and/or the core network_B 190 may be configured as one or more apparatuses in the core network. Here, the apparatuses in the core network may be apparatuses that perform part or all of processing or functions of apparatuses included in the core network_A 90 and/or the core network_B 190. Note that the apparatus in the core network may be referred to as a core network apparatus.

Furthermore, the core network is an IP mobile communication network, operated by a Mobile Network Operator (MNO), that connects to the access network and/or the DN. The core network may be a core network for a mobile communication operator that operates and manages the mobile communication system 1, or may be a core network for a virtual mobile communication operator such as a Mobile Virtual Network Operator (MVNO) and a Mobile Virtual Network Enabler (MVNE), or a virtual mobile communication service provider. Note that the core network_A 90 may be an Evolved Packet Core (EPC) constituting an Evolved Packet System (EPS), and the core network_B 190 may be a 5G Core Network (5GC) constituting a 5GS. Furthermore, the core network_B 190 may be a core network for a system providing the 5G communication service. Conversely, the EPC may be the core network_A 90, and the 5GC may be the core network_B 190. Note that the core network_A 90 and/or the core network_B 190 is not limited to the above, and may be a network for providing a mobile communication service.

Next, the core network_A 90 will be described. The core network_A 90 may include at least one of a Home Subscriber Server (HSS)_A 50, an Authentication Authorization Accounting (AAA), a Policy and Charging Rules Function (PCRF), the PGW_A 30, an ePDG, the SGW_A 35, the Mobility Management Entity (MME)_A 40, a Serving GPRS Support Node (SGSN), and an SCEF. Furthermore, these may also be configured as Network Functions (NFs). The NF may be a processing function included in a network. Further, the core network_A 90 can be connected to multiple radio access networks (UTRANs_A 20, E-UTRANs_A 80).

Although only the HSS (HSS_A 50), the PGW (PGW_A 30), the SGW (SGW_A 35), and the MME (MME_A 40) among the network elements are described in FIG. 3 for simplicity, it does not mean that no other apparatuses and/or NFs are included therein. Note that, for the sake of simplicity, the UE_A 10 is referred to as the UE, the HSS_A 50 as the HSS, the PGW_A 30 as the PGW, the SGW_A 35 as the SGW, the MME_A 40 as the MME, and the DN_A 5 and/or the PDN_A 6 as the DN or the PDN.

The following briefly describes each apparatus included in the core network_A 90.

The PGW_A 30 is a relay apparatus that is connected to the DN, the SGW_A 35, the ePDG, the WLAN ANa 70, the PCRF, and the AAA, and transfers the user data as a gateway between the DN (the DN_A 5 and/or the PDN_A 6) and the core network_A 90. Note that the PGW_A 30 may serve as a gateway for the IP communication and/or non-IP communication. Furthermore, the PGW_A 30 may have a function to transfer the IP communication, or may have a function to perform conversion between the non-IP communication and the IP communication. Note that multiple gateways like this may be deployed in the core network_A 90. Furthermore, the multiple gateways deployed may serve as gateways for connecting the core network_A 90 with a single DN.

Note that a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

Further, the PGW_A 30 may be connected to the SGW, the DN, and the User plane function (UPF) and/or the Session Management Function (SMF), or may be connected to the UE_A 10 via the U-Plane. Furthermore, the PGW_A 30 may be configured integrally with the UPF_A 235 and/or the SMF_A 230.

The SGW_A 35 is a relay apparatus that is connected to the PGW_A 30, the MME_A 40, the E-UTRAN_A 80, the SGSN, and the UTRAN_A 20, and transfers the user data as a gateway between the core network_A 90 and the 3GPP access networks (the UTRAN_A 20, the GERAN, and the E-UTRAN_A 80).

The MME_A 40 is a control apparatus that is connected to the SGW_A 35, the access network, the HSS_A 50, and the SCEF, and performs location information management including mobility management of the UE_A 10 via the access network, and access control. Furthermore, the MME_A 40 may include a function as a session management device to manage a session established by the UE_A 10. Multiple control apparatuses like this may be deployed in the core network_A 90, and, for example, a location management apparatus different from the MME_A 40 may be configured. Like the MME_A 40, the location management apparatus different from the MME_A 40 may be connected to the SGW_A 35, the access network, the SCEF, and the HSS_A 50. Further, the MME_A 40 may be connected to an Access and Mobility Management Function (AMF).

Furthermore, in a case that multiple MMEs are included in the core network_A 90, the multiple MMEs may be connected to each other. With this configuration, a context of the UE_A 10 may be transmitted and/or received between the MMEs. In this way, the MME_A 40 is a management apparatus to transmit and/or receive the control information related to the mobility management and the session management to and/or from the UE_A 10. In other words, the MME_A 40 may be a control apparatus for a Control Plane (C-Plane; CP).

The example is described in which the MME_A 40 is configured to be included in the core network_A 90, but the MME_A 40 may be a management apparatus configured in one or multiple core networks, DCNs, or NSIs, or may be a management apparatus connected to one or multiple core networks, DCNs, or NSIs. Here, multiple DCNs or NSIs may be operated by a single network operator, or by different network operators respectively.

The MME_A 40 may be a relay apparatus for transferring the user data as a gateway between the core network_A 90 and the access network. Note that the user data transmitted and/or received by the MME_A 40 serving as a gateway may be small data.

Furthermore, the MME_A 40 may be an NF having a function of the mobility management of the UE_A 10 or the like, or an NF managing one or multiple NSIs. The MME_A 40 may be an NF having one or multiple of these functions. Note that the NF may be one or multiple apparatuses deployed in the core network_A 90, a CP function (hereinafter, also referred to as a Control Plane Function (CPF) or a Control Plane Network Function) for the control information and/or control message, or a common CP function shared between multiple network slices.

Here, the NF is a processing function included in a network. That is, the NF may be a function apparatus such as an MME, an SGW, a PGW, a CPF, an AMF, an SMF, or a UPF, or may be a function such as Mobility Management (MM) and Session Management (SM), or capability information. The NF may be a function device to realize a single function, or a function device to realize multiple functions. For example, an NF to realize the MM function and an NF to realize the SM function may be separately present, or an NF to realize both the MM function and the SM function may be present.

The HSS_A 50 is a managing node that is connected to the MME_A 40, the AAA, and the SCEF, and manages subscriber information. The subscriber information of the HSS_A 50 is referred to during the access control performed by the MME_A 40, for example. Furthermore, the HSS_A 50 may be connected to a location management apparatus different from the MME_A 40. For example, the HSS_A 50 may be connected to the CPF_A 140.

Furthermore, the HSS_A 50, a Unified Data Management (UDM)_A 245 may be configured as different apparatuses and/or NFs or the same apparatus and/or NF.

The AAA is connected to the PGW 30, the HSS_A 50, the PCRF, and the WLAN ANa 70 and performs access control for the UE_A 10 connected via the WLAN ANa 70.

The PCRF is connected to the PGW_A 30, the WLAN ANa 75, the AAA, the DN_A 5 and/or the PDN_A 6 and performs QoS management on data delivery. For example, the PCRF manages QoS of a communication path between the UE_A 10, the DN_A 5, and/or the PDN_A 6. Furthermore, the PCRF may be an apparatus to create and/or manage a Policy and Charging Control (PCC) rule and/or a routing rule used by each apparatus for transmitting and/or receiving user data.

In addition, the PCRF may be a PCF to create and/or manage a policy. To be more specific, the PCRF may be connected to the UPF_A 235.

The ePDG is connected to the PGW 30 and the WLAN ANb 75 and delivers user data as a gateway between the core network_A 90 and the WLAN ANb 75.

The SGSN is a control apparatus that is connected to the UTRAN_A 20, the GERAN, and the SGW_A 35, for performing location management between a 3G/2G access network (UTRAN/GERAN) and the LTE (4G) access network (E-UTRAN). In addition, the SGSN has functions of selecting the PGW and the SGW, managing a time zone of the UE_A 10, and selecting the MME_A 40 at the time of handover to the E-UTRAN.

The SCEF is a relay apparatus that is connected to the DN_A 5 and/or the PDN_A 6, the MME_A 40, and the HSS_A 50 and transfers the user data as a gateway for connecting the DN_A 5 and/or the PDN_A 6 with the core network_A 90. Note that the SCEF may serve as a gateway for non-IP communication. Furthermore, the SCEF may have a function to perform conversion between non-IP communication and IP communication. Multiple gateways like this may be deployed in the core network_A 90. Furthermore, multiple gateways connecting the core network_A 90 with a single DN_A 5 and/or PDN_A 6 and/or DN may be also deployed. Note that the SCEF may be outside or inside the core network.

Next, the core network_B 190 will be described. The core network_B 190 may include at least one of an Authentication Server Function (AUSF), an Access and Mobility Management Function (AMF)_A 240, an Unstructured Data Storage Function (UDSF), a Network Exposure Function (NEF), a Network Repository Function (NRF), a Policy Control Function (PCF), a Session Management Function (SMF)_A 230, a Unified Data Management (UDM), a User Plane Function (UPF)_A 235, an Application Function (AF), and a Non-3GPP InterWorking Function (N3IWF). Furthermore, these may also be configured as Network Functions (NFs). The NF may be a processing function included in a network.

Although only the AMF (AMF_A 240), the SMF (SMF_A 230), and the UPF (UPF_A 235) are illustrated in FIG. 4 among the above elements for simplicity, it does not mean that no other elements (apparatuses and/or Network Functions (NFs)) are included therein. Note that, for the sake of simplicity, the UE_A 10 is also referred to as the UE, the AMF_A 240 as the AMF, the SMF_A 230 as the SMF, the UPF_A 235 as the UPF, and the DN_A 5 as the DN.

In addition, FIG. 4 illustrates an N1 interface (hereinafter, also referred to as a reference point), an N2 interface, an N3 interface, an N4 interface, an N6 interface, an N9 interface, and an N11 interface. Here, the N1 interface is an interface between the UE and the AMF, the N2 interface is an interface between (R) access network (AN) and the AMF, the N3 interface is an interface between the (R) access network (AN) and the UPF, the N4 interface is an interface between the SMF and the UPF, the N6 interface is an interface between the UPF and the DN, the N9 interface is an interface between the UPF and the UPF, and the N11 interface is an interface between the AMF and the SMF. These interfaces can be used to perform communication between the apparatuses. Here, the (R)AN is hereinafter also referred to as an NG RAN.

The following briefly describes each apparatus included in the core network_B 190.

First, the AMF_A 240 is connected to another AMF, the SMF (SMF_A 230), the access network (that is, the UTRAN_A 20, the E-UTRAN_A 80, and the NG-RAN_A 120), the UDM, the AUSF, and the PCF. The AMF_A 240 may play roles of Registration management, Connection management, Reachability management, Mobility management of the UE_A 10 or the like, transfer of a Session Management (SM) message between the UE and the SMF, Access Authentication or Access Authorization, a Security Anchor Function (SEA), Security Context Management (SCM), support for the N2 interface for the N3IWF, support for transmission and/or reception of NAS signals to and/or from the UE via the N3IWF, authentication of the UE connected via the N3IWF, management of Registration Management (RM) states, management of Connection Management (CM) states, and the like. In addition, one or more AMF_A 240s may be deployed within the core network_B 190. In addition, the AMF_A 240 may be an NF that manages one or more Network Slice Instances (NSI). In addition, the AMF_A 240 may also be a Common Control Plane Network Function (Common CPNF, or CCNF) shared among multiple NSIs.

Additionally, the RM state includes a deregistered state (RM-DEREGISTERED state) and a registered state (RM-REGISTERED state). In the RM-DEREGISTERED state, the UE is not registered in the network, and thus the AMF is not able to reach the UE because the UE context in the AMF does not have valid location information and routing information for the UE. In the RM-REGISTERED state, the UE is registered in the network, and thus the UE can receive services that require registration with the network.

Additionally, the CM state includes a disconnected state (CM-IDLE state) and a connected state (CM-CONNECTED state). In the CM-IDLE state, the UE is in the RM-REGISTERED state but does not have a NAS signalling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signalling connection established between the AMF and the UE via the N1 interface. Also, in the CM-CONNECTED state, the UE may have the N2 interface connection (N2 connection) and/or the N3 interface connection (N3 connection).

Further, the SMF_A 230 may include a function of Session Management (SM) such as a PDU session, a function of IP address allocation to the UE and management thereof, a function of UPF selection and control, a function of configuration of the UPF for routing traffic to an appropriate destination, a function of giving a notification that downlink data has arrived (Downlink Data Notification), a function of providing SM information specific to the AN (for each AN) that is transmitted to the AN via the AMF via the N2 interface, a function of determining the Session and Service Continuity mode (SSC mode) for a session, a roaming function, and the like. Further, the SMF_A 230 may be connected to the AMF_A 240, the UPF_A 235, the UDM, and the PCF.

Further, the UPF_A 235 is connected to the DN_A 5, the SMF_A 230, another UPF, and the access network (that is, the UTRAN_A 20, the E-UTRAN_A 80, and the NG-RAN_A 120). The UPF_A 235 may play roles of an anchor to intra-RAT mobility or inter-RAT mobility, Packet routing & forwarding, an Uplink classifier (UL CL) function to support routing of multiple traffic flows for one DN, a branching point function to support a multi-homed PDU session, QoS processing for a user plane, verification of uplink traffic, buffering of downlink packets, a function of triggering Downlink Data Notification, and the like. Furthermore, the UPF_A 235 may be a relay apparatus that transfers the user data as a gateway between the DN_A 5 and the core network_B 190. Note that the UPF_A 235 may serve as a gateway for IP communication and/or non-IP communication. Furthermore, the UPF_A 235 may have a function of transferring IP communication or a function to perform conversion between non-IP communication and IP communication. The multiple gateways deployed may serve as gateways for connecting the core network_B 190 with a single DN. Note that the UPF_A 235 may have connectivity with another NF or may be connected to each apparatus via another NF.

Note that, between the UPF_A 235 and the access network, a UPF_C 239 (also referred to as a branching point or an uplink classifier), which is a UPF different from the UPF_A 235, may be present as the apparatus or the NF. In a case that the UPF_C 239 is present, the PDU session between the UE_A 10 and the DN_A 5 may be established via the access network, the UPF_C 239, and the UPF_A 235.

Additionally, the AUSF is connected to the UDM and the AMF_A 240. The AUSF functions as an authentication server.

The UDSF provides a function for all NFs to store or retrieve information as unstructured data.

The NEF provides a means to securely provide services and capabilities provided by the 3GPP network. The NEF stores information received from another NF as structured data.

In a case that a NF Discovery Request is received from a NF instance, the NRF provides the NF with information of found NF instances or holds information of available NF instances or services supported by the instances.

The PCF is connected to the SMF (SMF_A 230), the AF, and the AMF_A 240. The PCF provides a policy rule and the like.

The UDM is connected to the AMF_A 240, the SMF (SMF_A 230), the AUSF, and the PCF. The UDM includes a UDM FE (application front end) and a User Data Repository (UDR). The UDM FE performs processing of authentication information (credentials), location management, subscriber management (subscription management), and the like. The UDR stores data necessary for the UDM FE for provision and the policy profile necessary for the PCF.

The AF is connected to the PCF. The AF affects traffic routing or is involved in the policy control.

The N3IWF provides functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying user plane packets between the UE and the UPF, selecting the AMF, and the like.

1.2. Configuration of Each Apparatus

The configuration of each apparatus will be described below. Note that some or all of apparatuses to be described below and functions of units of the apparatuses may operate on physical hardware, or logical hardware which is virtually configured on general-purpose hardware.

1.2.1. Configuration of UE

Figure 5:
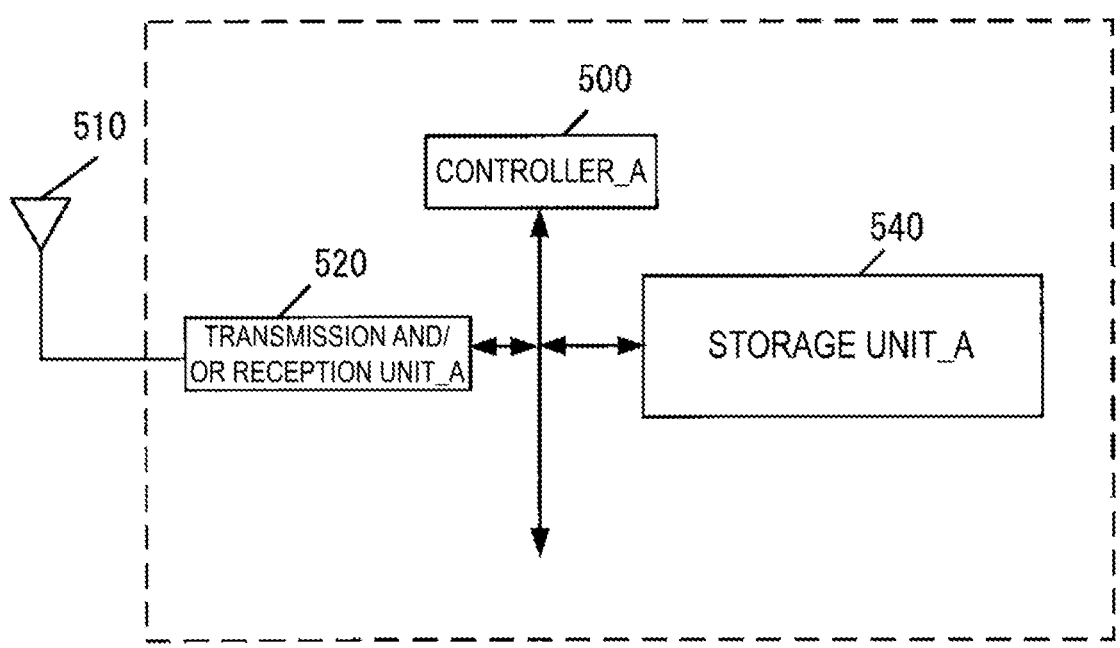
FIG. 5 is a diagram illustrating an apparatus configuration of UE.

First, an example of an apparatus configuration of the UE_A 10 is illustrated in FIG. 5. As illustrated in FIG. 5, the UE_A 10 includes a controller_A 500, a transmission and/or reception unit_A 520, and a storage unit_A 540. The transmission and/or reception unit_A 520 and the storage unit_A 540 are connected to the controller_A 500 via a bus. Furthermore, an external antenna 410 is connected to the transmission and/or reception unit_A 520.

The controller_A 500 is a function unit for controlling the entire UE_A 10 and implements various processes of the entire UE_A 10 by reading out and performing various types of information and programs stored in the storage unit_A 540.

The transmission and/or reception unit_A 520 is a function unit through which the UE_A 10 connects to the base station in the access network (the UTRAN_A 20, the E-UTRAN_A 80, and the NG-RAN_A 120) and/or the radio LAN access point (WLAN AN) and connects to the access network. In other words, the UE_A 10 can connect to the base station and/or the access point in the access network via the external antenna 410 connected to the transmission and/or reception unit_A 520. To be specific, the UE_A 10 can transmit and/or receive user data and/or control information to and/or from the base station and/or the access point in the access network via the external antenna 410 connected to the transmission and/or reception unit_A 520.

The storage unit_A 540 is a function unit that stores programs, data, and the like necessary for each operation of the UE_A 10, and include, for example, a semiconductor memory, a Hard Disk Drive (HDD), a Solid State Drive (SSD), or the like. The storage unit_A 540 stores identification information, control information, a flag, a parameter, a rule, a policy, and the like included in a control message which is transmitted and/or received in the communication procedure described below.

1.2.2. eNB/NR Node

Figure 6:
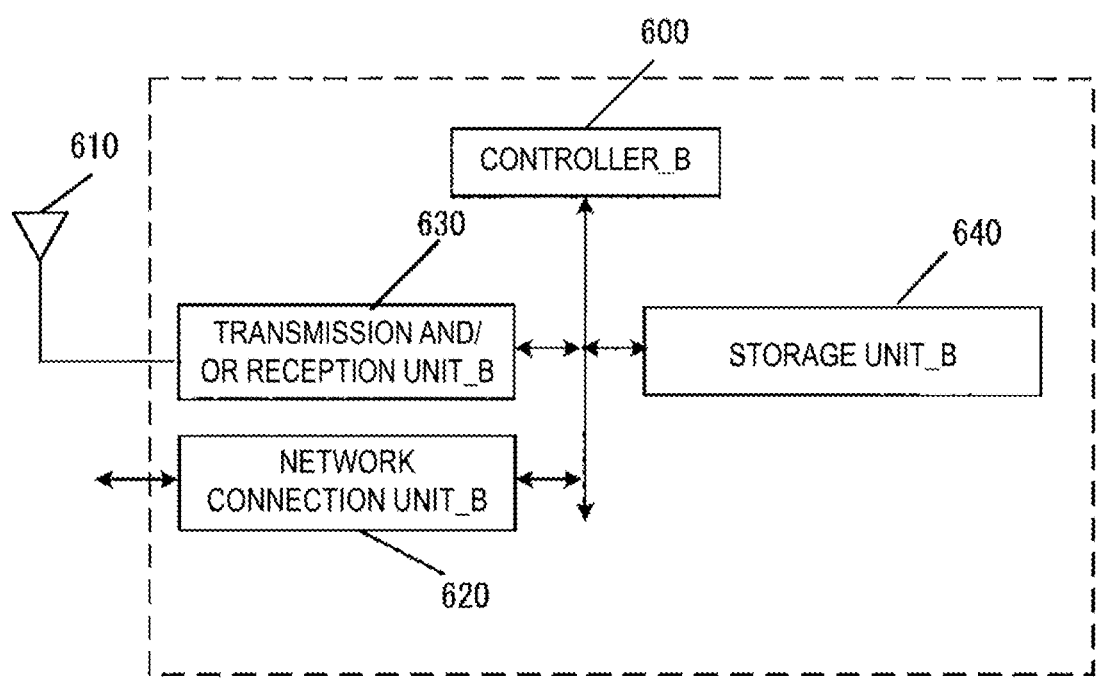
FIG. 6 is a diagram illustrating an apparatus configuration of an eNB/NR node.

Next, FIG. 6 illustrates an example of an apparatus configuration of the eNB_A 45 and the NR node_A 122. As illustrated in FIG. 6, the eNB_A 45 and the NR node_A 122 include a controller_B 600, a network connection unit_B 620, a transmission and/or reception unit_B 630, and a storage unit_B 640. The network connection unit_B 620, the transmission and/or reception unit_B 630, and the storage unit_B 640 are connected to the controller_B 600 via a bus. Furthermore, an external antenna 510 is connected to the transmission and/or reception unit_B 630.

The controller_B 600 is a function unit for controlling the entire eNB_A 45 and the NR node_A 122, and implements various processes of the entire eNB_A 45 and the NR node_A 122 by reading out and performing various types of information and programs stored in the storage unit_B 640.

The network connection unit_B 620 is a function unit through which the eNB_A 45 and the NR node_A 122 connect to the AMF_A 240 and the UPF_A 235 in the core network. In other words, the eNB_A 45 and the NR node_A 122 can be connected to the AMF_A 240 and the UPF_A 235 in the core network via the network connection unit_B 620. Specifically, the eNB_A 45 and the NR node_A 122 can transmit and/or receive user data and/or control information to and/or from the AMF_A 240 and/or the UPF_A 235 via the network connection unit_B 620.

The transmission and/or reception unit_B 630 is a function unit through which the eNB_A 45 and the NR node_A 122 connect to the UE_A 10. In other words, the eNB_A 45 and the NR node_A 122 can transmit and/or receive the user data and/or the control information to and/or from the UE_A 10 via the transmission and/or reception unit_B 630.

The storage unit_B 640 is a function unit that stores programs, data, and the like that are necessary for each operation of the eNB_A 45 and the NR node_A 122. The storage unit_B 640 includes, for example, a semiconductor memory, an HDD, an SSD, or the like. The storage unit_B 640 stores identification information, control information, a flag, a parameter, and the like included in a control message which is transmitted and/or received in the communication procedure described below. The storage unit_B 640 may store these pieces of information as the contexts for each UE_A 10.

1.2.3. Configuration of MME/AMF

Figure 7:
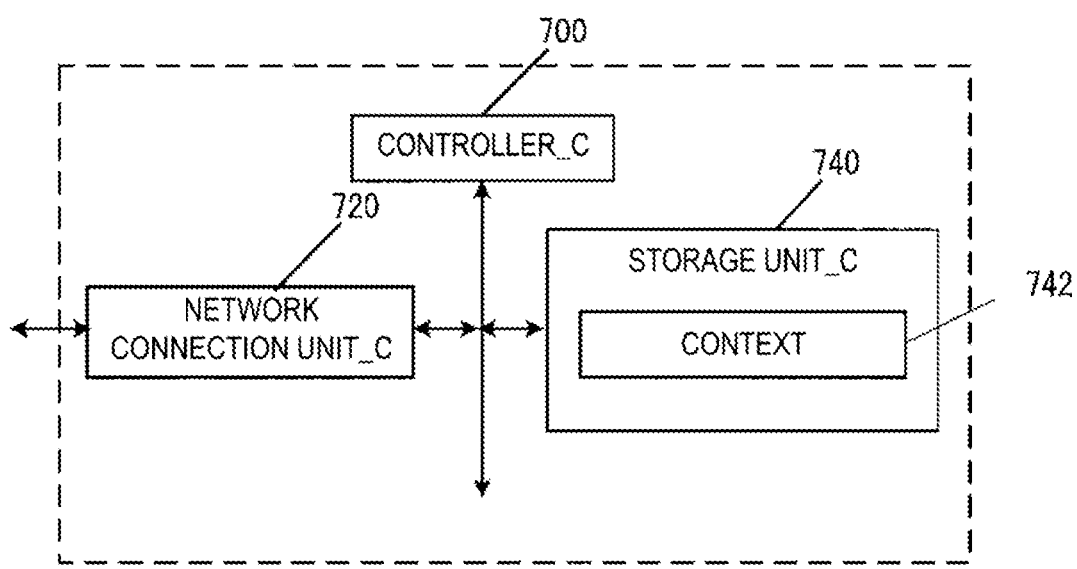
FIG. 7 is a diagram illustrating an apparatus configuration of an MME/AMF.

Next, FIG. 7 illustrates an example of an apparatus configuration of the MME_A 40 and/or the AMF_A 240. As illustrated in FIG. 7, the MME_A 40 or the AMF_A 240 includes a controller_C 700, a network connection unit_C 720, and a storage unit_C 740. The network connection unit_C 720 and the storage unit_C 740 are connected to the controller_C 700 via a bus. Furthermore, the storage unit_C 740 stores a context 642.

The controller_C 700 is a function unit for controlling the entire MME_A 40 or the AMF_A 240. The controller_C 700 reads out and performs various kinds of information and programs stored in the storage unit_C 740 to achieve various processes of the entire AMF_A 240.

The network connection unit_C 720 is a function unit through which the MME_A 40 or the AMF_A 240 connect to another MME_A 40, the AMF 240, the SMF_A 230, the base station in the access network (the UTRAN_A 20, the E-UTRAN_A 80, and the NG-RAN_A 120) and/or the radio LAN access point (WLAN AN), the UDM, the AUSF, and the PCF. In other words, the MME_A 40 and/or the AMF_A 240 can transmit and/or receive user data and/or control information to and/or from the base station and/or the access point, the UDM, the AUSF, and the PCF in the access network via the network connection unit_C 720.

The storage unit_C 740 is a function unit for storing programs, data, and the like necessary for each operation of the MME_A 40 and/or the AMF_A 240. The storage unit_C 740 includes, for example, a semiconductor memory, an HDD, an SSD, or the like. The storage unit_C 740 stores identification information, control information, a flag, a parameter, and the like included in a control message which is transmitted and/or received in the communication procedure described below. Examples of the context 642 stored in the storage unit_C 740 may include a context stored for each UE, a context stored for each PDU session, and a context stored for each bearer. The context stored for each UE may include an IMSI, an MSISDN, MM State, a GUTI, a ME Identity, a UE radio access capability, a UE network capability, an MS network capability, an access restriction, an MME F-TEID, an SGW F-TEID, an eNB address, an MME UE S1AP ID, an eNB UE S1AP ID, an NR node address, an NR node ID, a WAG address, and a WAG ID. Furthermore, the context stored for each PDU session may include an APN in Use, an assigned session type, IP address(es), a PGW F-TEID, an SCEF ID, and a default bearer. Furthermore, the context stored for each bearer may include an EPS bearer ID, a TI, a TFT, an SGW F-TEID, a PGW F-TEID, an MME F-TEID, an eNB address, an NR node address, a WAG address, an eNB ID, an NR node ID, and a WAG ID.

1.2.4. Configuration of SMF

Figure 8:
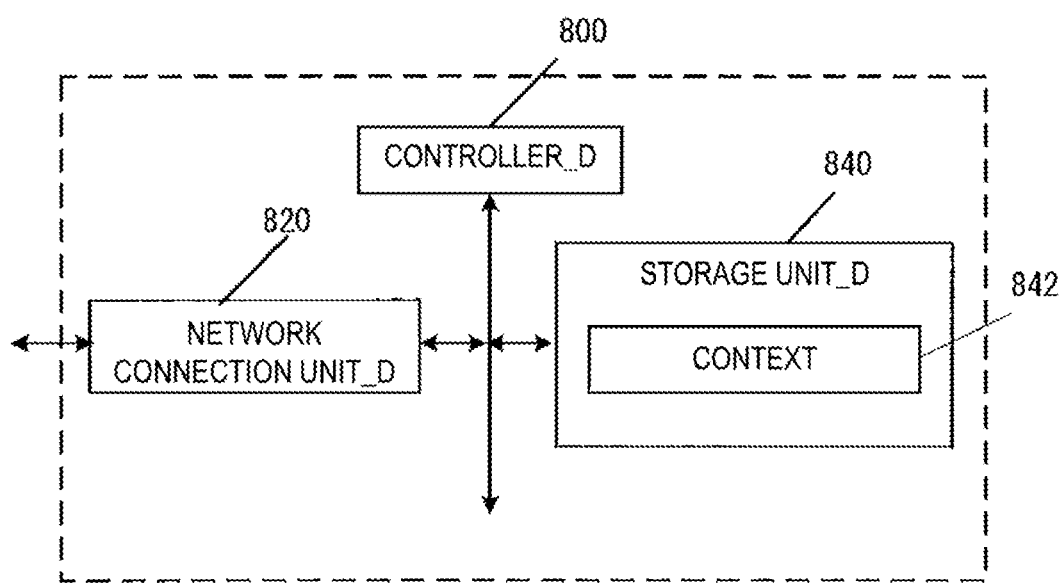
FIG. 8 is a diagram illustrating an apparatus configuration of an SMF/PGW/UPF.

Next, FIG. 8 illustrates an example of an apparatus configuration of the SMF_A 230. As illustrated in FIG. 8, the SMF_A 230 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 742.

The controller_D 800 of the SMF_A 230 is a function unit for controlling the entire SMF_A 230 and implements various processes of the entire SMF_A 230 by reading out and performing various types of information and programs stored in the storage unit_D 840.

Further, the network connection unit_D 820 in the SMF_A 230 is a function unit for the SMF_A 230 to connect to the AMF_A 240, the UPF_A 235, the UDM, and the PCF. In other words, the SMF_A 230 can transmit and/or receive user data and/or control information to and/or from the AMF_A 240, the UPF_A 235, the UDM, and the PCF via the network connection unit_D 820.

Furthermore, the storage unit_D 840 of the SMF_A 230 is a function unit for storing programs, data, and the like necessary for each operation of the SMF_A 230. The storage unit_D 840 of the SMF_A 230 includes, for example, a semiconductor memory, an HDD, an SSD, or the like. The storage unit_D 840 of the SMF_A 230 stores identification information, control information, a flag, a parameter, and the like included in a control message which is transmitted and/or received in the communication procedure described below. In addition, examples of the context 742 stored in the storage unit_D 840 of the SMF_A 230 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each Data Network Identifier. The context stored for each PDU session may include Assigned Session Type, IP Address(es), SGW F-TEID, PGW F-TEID, and Default Bearer. The context stored for each bearer may include an EPS bearer ID, a TFT, an SGW F-TEID, and a PGW F-TEID.

1.2.5. Configuration of PGW/UPF

Next, FIG. 8 illustrates an example of an apparatus configuration of the PGW_A 30 or the UPF_A 235. As illustrated in FIG. 8, each of the PGW_A 30 or the UPF_A 235 includes a controller_D 800, a network connection unit_D 820, and a storage unit_D 840. The network connection unit_D 820 and the storage unit_D 840 are connected to the controller_D 800 via a bus. In addition, the storage unit_D 840 stores a context 742.

The controller_D 800 of the PGW_A 30 or the UPF_A 235 is a function unit for controlling the entire PGW_A 30 or UPF_A 235, and implements various processes of the entire PGW_A 30 or the UPF_A 235 by reading out and performing various types of information and programs stored in the storage unit_D 840.

Further, the network connection unit_D 820 of the PGW_A 30 or the UPF_A 235 is a function unit through which the PGW_A 30 or the UPF_A 235 connects to the DN (that is, the DN_A 5), the SMF_A 230, another UPF_A 235, and the access network (that is, the UTRAN_A 20, the E-UTRAN_A 80, and the NG-RAN_A 120). In other words, the UPF_A 235 can transmit and/or receive the user data and/or the control information to and/or from the DN (that is, the DN_A 5), the SMF_A 230, another UPF_A 235, and the access network (that is, the UTRAN_A 20, the E-UTRAN_A 80, and the NG-RAN_A 120) via the network connection unit_D 820.

The storage unit_D 840 in the UPF_A 235 is a function unit for storing programs, data, and the like necessary for each operation by the UPF_A 235. The storage unit_D 840 in the UPF_A 235 includes, for example, a semiconductor memory, an HDD, an SSD, or the like. The storage unit_D 840 in the UPF_A 235 stores identification information, control information, a flag, a parameter, and the like included in the control message transmitted and/or received in a communication procedure described later. In addition, examples of the context 742 stored in the storage unit_D 840 of the UPF_A 235 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each Data Network Identifier. The context stored for each PDU session may include Assigned Session Type, IP Address(es), SGW F-TEID, PGW F-TEID, and Default Bearer. The context stored for each bearer may include an EPS bearer ID, a TFT, an SGW F-TEID, and a PGW F-TEID.

1.2.6. Information Stored in Storage Unit of Each Apparatus

Next, each piece of information stored in the storage unit of each of the above-described apparatuses will be described.

An International Mobile Subscriber Identity (IMSI) is permanent identification information of a subscriber (user), and is identification information assigned to a user using the UE. The IMSI stored by the UE_A 10, the MME_A 40/CPF_A 140/AMF_A 2400, and the SGW_A 35 may be the same as the IMSI stored by an HSS_A 50.

The EMM State/MM State indicates a mobility management state of the UE_A 10 or the MME_A 40/CPF_A 140/AMF_A 240. For example, the EMM State/MM State may be an EMM-REGISTERED state (registered state) in which the UE_A 10 is registered in the network, and/or an EMM-DEREGISTERD state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information for distinguishing a state in which the UE_A 10 is registered in the EPC from a state in which the UE_A 10 is registered in the NGC or 5GC.

The Globally Unique Temporary Identity (GUTI) is temporary identification information of the UE_A 10. The GUTI includes identification information (Globally Unique MME Identifier (GUMMEI)) of the MME_A 40/CPF_A 140/AMF_A 240 and identification information (M-Temporary Mobile Subscriber Identity (M-TMSI)) of the UE_A 10 in a specific MME_A 40/CPF_A 140/AMF_A 240. The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by the storage unit of the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. Furthermore, the IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

The SGW F-TEID is information for identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. In addition, the IP address of the PGW_A 30/UPGW_A 130/SMF_A 230/UPF_A 235 and the TEID of the PGW_A 30/UPGW_A 130/SMF_A 230/UPF_A 235 may be stored independently of each other. The PGW F-TEID may be identification information for user data, or identification information for control information.

The eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 for connecting the core network A_90. Note that the APN may be a Data Network Name (DNN). Therefore, the APN may be represented by a DNN, or the DNN may be represented by the APN.

Note that the APN may be identification information for identifying such a gateway, or identification information for identifying an external network such as the DN. Note that, in a case that multiple gateways connecting the core network and the DN are deployed, there may be multiple gateways that can be selected according to the APN. Furthermore, one gateway may be selected among such multiple gateways by another method using identification information other than the APN.

The UE Radio Access Capability is identification information indicating a radio access capability of the UE_A 10. The UE Network Capability includes an algorithm of security supported by the UE_A 10 and a key derivative function. The MS Network Capability is information including, in the UE_A 10 having a function of a GERAN_A 25 and/or a UTRAN_A 20, one or more pieces of information necessary for an SGSN_A 42. The Access Restriction is registration information for access restriction. The eNB Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is an APN recently used. The APN in Use may be Data Network Identifier. This APN may include identification information of the network and identification information of a default operator. Furthermore, the APN in Use may be information for identifying a DN with which the PDU session is established.

The Assigned Session Type is information indicating a PDU session type. The Assigned Session Type may be Assigned PDN Type. The PDU session type may be IP, or non-IP. Furthermore, in a case that the PDU session type is IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, may be an IPv6 address, may be an IPv6 prefix, or may be an interface ID. Note that in a case that the Assigned Session Type indicates non-IP, an element of the IP Address may not be included.

The DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or identification information for identifying an external network such as the DN. Note that, in a case that multiple gateways connecting the core network_B 190 and the DN are deployed, there may be multiple gateways that can be selected according to the DN ID. Furthermore, one gateway may be selected among such multiple gateways by another method using identification information other than the DN ID.

Furthermore, the DN ID may be information equivalent to the APN, or different from the APN. Note that in a case that the DN ID is the information different from the APN, each apparatus may manage information indicating correspondence between the DN ID and the APN, perform a procedure to inquire the APN by using the DN ID, or perform a procedure to inquire the DN ID by using the APN.

SCEF ID is an IP address of an SCEF_A 46 used in the PDU session. The Default Bearer is information acquired and/or created in a case that a PDU session is established and is EPS bearer identification information for identifying a default bearer associated with the PDU session.

The EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all packet filters associated with the EPS bearer. The TFT is information for identifying some pieces of user data to be transmitted and/or received, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as application data to be transmitted and/or received with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with a PDU session. Note that the EPS bearer may be a logical communication path established between the UE_A 10 and the PGW_A 30/UPGW_A 130/UPF_A 235, or a communication path constituting the PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. Furthermore, the Default Bearer may be information that the UE_A 10 and/or the SGW_A 35 and/or the PGW_A 30/UPGW_A 130/SMF_A 230/UPF_A 235 acquire from the core network in a case that the PDU session is established. Note that the default bearer is an EPS bearer first established during the PDN connection/PDU session, and is such an EPS bearer that only one bearer can be established during one PDN connection/PDU session. The default bearer may be an EPS bearer that can be used for communication of user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used for communication of user data not associated with the TFT.

User Identity is information for identifying a subscriber. The User Identity may be an IMSI, or an MSISDN. Furthermore, the User Identity may also be identification information other than the IMSI or the MSISDN. Serving Node Information is information for identifying the MME_A 40/CPF_A 140/AMF_A 240 used in a PDU session, and may be an IP address of the MME_A 40/CPF_A 140/AMF_A 240.

The eNB Address is an IP address of the eNB_A 45. The eNB ID is information for identifying the UE in the eNB_A 45. MME Address is an IP address of the MME_A 40/CPF_A 140/AMF_A 240. MME ID is information for identifying the MME_A 40/CPF_A 140/AMF_A 240. The NR node Address is an IP address of the NR node_A 122. The NR node ID is information for identifying the NR node_A 122. The WAG Address is an IP address of the WAG. The WAG ID is information for identifying the WAG.

An anchor or an anchor point is a UFP including a gateway function of the DN and the PDU session. The UPF being an anchor point may be a PDU session anchor or may be an anchor.

The SSC mode indicates a mode of Session and Service Continuity that the system and/or each apparatus supports in 5GC. To be more specific, the SSC mode may be a mode indicating a type of the session and service continuity supported by the PDU session that is established between the UE_A 10 and the anchor point). Here, the anchor point may be the UPGW, or may be the UPF_A 235. Note that the SSC mode may be a mode indicating a type of the session and service continuity configured for each PDU session. The SSC mode may include three modes of SSC mode 1, SSC mode 2, and SSC mode 3. The SSC mode is associated with the anchor point, and cannot be changed while the PDU session is in a state of being established.

Further, the SSC mode 1 according to the present embodiment is a mode of the session and service continuity in which the same UPF is continuously maintained as an anchor point regardless of the access technology such as the Radio Access Technology (RAT) and the cell the UE_A 10 uses to connect to a network. To be more specific, the SSC mode 1 may be a mode in which even in a case that the mobility of the UE_A 10 occurs, the session and service continuity is achieved without changing the anchor point used by the established PDU session.

Further, the SSC mode 2 according to the present embodiment is, in a case that the PDU session includes one anchor point associated with the SSC mode 2, a mode of session and service continuity in which the PDU session is first released and then the PDU session is established. To be more specific, the SSC mode 2 is a mode in which, in a case that relocation of the anchor point occurs, the PDU session is once deleted and then a new PDU session is established.

Further, the SSC mode 2 is a mode of session and service continuity in which the same UPF is continuously maintained as the anchor point only in the serving area of the UPF. To be more specific, the SSC mode 2 may be a mode in which as long as the UE_A 10 is in the serving area of the UPF, the session and service continuity is achieved without changing the UPF used by the established PDU session. Further, the SSC mode 2 may be a mode in which in a case that the mobility that the UE_A 10 leaves the serving area of the UPF occurs, the session and service continuity is achieved by changing the UPF used by the established PDU session.

Here, the serving area of the TUPF may be an area in which one UPF can provide a session and service continuity function, or a subset of the access network such as the RAT or the cell used in a case that the UE_A 10 connects to a network. Further, the subset of the access network may be a network including one or multiple RATs and/or cells, or may be the TA.

Further, the SSC mode 3 according to the present embodiment is a mode of session and service continuity in which a new anchor point for the same DN and a PDU session between the UEs can be established without releasing the PDU session between the UE and the anchor point.

Further, the SSC mode 3 is a mode of the session and service continuity that allows a new PDU session and/or communication path to be established via a new UPF to the same DN before disconnecting the PDU session and/or the communication path established between the UE_A 10 and the UPF. Further, the SSC mode 3 may be a mode of the session and service continuity that allows the UE_A 10 to be multi-homed.

And/or, the SSC mode 3 may be a mode that allows the session and service continuity using multiple PDU sessions and/or the UPFs associated with the PDU sessions. In other words, in the case of the SSC mode 3, each apparatus may achieve the session and service continuity using the multiple PDU sessions, or may achieve the session and service continuity using the multiple TUPFs.

Here, in the case that each apparatus establishes a new PDU session and/or communication path, a new UPF may be selected by the network, or a new UPF may be an optimal UPF for a place at which the UE_A 10 connects to the network. Further, in a case that the multiple PDU sessions and/or the UPFs used by the PDU sessions are effective, the UE_A 10 may correlate the application and/or flow communications to a new established PDU session immediately or based on the completion of the communications.

1.3. Description of Initial Procedure

Next, before describing detailed processes of an initial procedure in the present embodiment, in order to avoid redundant descriptions, terminology specific to the present embodiment and primary identification information used in each procedure will be described beforehand.

The network according to the present embodiment refers to at least a part of the access network_A 20/80, the access network_B 80/120, the core network_A 90, the core network_B 190, the DN_A 5, and the PDN_A 6. Further, one or more apparatuses included in at least a part of the access network_A 20/80, the access network_B 80/120, the core network_A 90, the core network_B 190, the DN_A 5, and the PDN_A 6 may be referred to as a network or a network apparatus. Specifically, the expression "the network performs transmission and/or reception of a message and/or performs a procedure" signifies that "an apparatus (network apparatus) in the network performs transmission and/or reception of a message and/or performs a procedure".

A Session Management (SM) message (referred also to as a Non-Access-Stratum (NAS) SM message or an SM message) according to the present embodiment may be a NAS message used in a procedure for the SM (also referred to as a session management procedure or an SM procedure), or a control message transmitted and/or received between the UE_A 10 and the SMF_A 230 via the AMF_A 240. Furthermore, the SM message may include a PDU session establishment request message, a PDU session establishment accept message, a PDU session completion message, a PDU session reject message, a PDU session modification request message, a PDU session modification accept message, a PDU session modification reject message, and the like. The procedure for SM may include a PDU session establishment procedure, a PDU session modification procedure, and the like.

A Tracking Area (TA) according to the present embodiment is a range that can be represented by location information of the UE_A 10 managed by the core network, and may include one or more cells, for example. Furthermore, the TA may be a range in which a control message such as a paging message is broadcast, or a range in which the UE_A 10 can move without performing a handover procedure.

The TA list according to the present embodiment is a list including one or more TAs that the network allocates to the UE_A 10. Note that, while the UE_A 10 is moving within the one or more TAs included in the TA list, the UE_A 10 can move without performing the registration procedure. In other words, the TA list may be an information group indicating an area in which the UE_A 10 can move without performing the registration procedure.

The Network Slice according to the present embodiment is a logical network for providing specific network capability and network characteristics. The network slice is also hereinafter referred to as an NW slice.

The Network Slice Instance (NSI) according to the present embodiment is an entity of each of one or multiple Network Slices configured in the core network_B 190. Further, the NSI according to the present embodiment may include a virtual Network Function (NF) generated using a Network Slice Template (NST). Here, the NST is associated with a resource request for providing a required communication service or capability, and is a logical expression of one or multiple Network Functions (NFs). Specifically, the NSI may be an aggregation including multiple NFs in the core network_B 190. The NSI may be a logical network configured to classify the user data delivered through a service or the like. The network slice may include at least one or more NFs. The NF included in the network slice may be an apparatus shared by another network slice or otherwise. The UE_A 10 and/or the apparatus in the network can be allocated to one or multiple network slices, based on registration information and/or APN such as NSSAI and/or S-NSSAI and/or a UE usage type and/or one or multiple network slice type IDs and/or one or multiple NS IDs.

The S-NSSAI according to the present embodiment stands for Single Network Slice Selection Assistance information, and is information for identifying a network slice. The S-NSSAI may include a Slice/Service type (SST) and a Slice Differentiator (SD). The S-NSSAI may only include the SST, or may include both of the SST and the SD. Here, the SST is information indicating operation of the network slice expected in terms of the function and the service. Further, the SD may be information for complementing the SST in a case that one NSI is selected out of multiple NSIs indicated by the SST. The S-NSSAI may be information specific to a Public Land Mobile Network (PLMN), maybe standard information made to be common to the PLMNs, or may be information specific to a communication operator different for each PLMN.

To be more specific, the SST and/or the SD may be the standard information made to be common to the PLMNs (Standard Value), or may be the information specific to a communication operator different for each PLMN (Non Standard Value). Further, the network may store one or multiple pieces of S-NSSAI in the registration information of the UE_A 10 as default S-NSSAI.

The Single Network Slice Selection Assistance information (NSSAI) according to the present embodiment is a set of pieces of S-NSSAI. Each piece of S-NSSAI included in the NSSAI is information for assisting the access network or the core network to select the NSI. The UE_A 10 may store the NSSAI allowed by the network for each PLMN. Further, the NSSAI may be information used for selecting the AMF_A 240.

An operator A network according to the present embodiment is a network operated by a network operator A (operator A). Here, for example, the operator A may deploy the NW slice common to an operator B to be described later.

An operator B network according to the present embodiment is a network operated by a network operator B (operator B). Here, for example, the operator B may deploy the NW slice common to the operator A.

The first NW slice according to the present embodiment is an NW slice to which an established PDU session belongs in a case that the UE is connected to a specific DN. Note that, for example, the first NW slice may be an NW slice managed in the operator A network, or may be an NW slice managed in common in the operator B network.

The second NW slice according to the present embodiment is an NW slice to which another PDU session belongs, which allows connection to the DN used as a connection destination by the PDU session to which the first NW slice belongs. Note that the first NW slice and the second NW slice may be operated by the same operator, or may be operated by different operators.

An equivalent PLMN according to the present embodiment is a PLMN that is regarded as the same PLMN as any PLMN in the network.

A Dedicated Core Network (DCN) according to the present embodiment is one or multiple specific subscriber type-dedicated core networks configured in the core network_A 90. Specifically, for example, the DCN for the UE registered as a user of the Machine to Machine (M2M) communication function may be configured in the core network_A 90. Further, in addition to the above, a default DCN for the UE with no appropriate DCN may be configured in the core network_A 90. In addition, in the DCN, at least one or more MMEs 40 or SGSNs_A 42 may be deployed, and further, at least one or more SGWs_A 35, PGWs_A 30, or PCRFs_A 60 may be deployed. Note that the DCN may be identified with a DCN ID, and further, the UE may be allocated to one DCN, based on information such as the UE usage type and/or the DCN ID.

The first timer according to the present embodiment may be a timer for managing the initiation of a procedure for session management such as the PDU session establishment procedure and/or transmission of a Session Management (SM) message such as the PDU session establishment request message, and may be information indicating a value of a back-off timer for managing a behavior of the session management. In the following, the first timer and/or the back-off timer may be referred to as a timer. While the first timer is performed, the initiation of the procedure for the session management and/or the transmission and/or reception of the SM message of each apparatus may be prohibited. Note that the first timer may be configured by being associated with at least one of a congestion management unit applied by the NW and/or a congestion management unit identified by the UE. For example, the first timer may be configured with at least one unit of an APN/DNN unit, and/or an identification information unit indicating one or multiple NW slices, and/or a reject cause value unit in the session management procedure, and/or a session unit in which rejection is indicated in the session management procedure, and/or a PTI unit of the session management procedure.

Note that the SM message may be a NAS message used in the procedure for session management, or may be a control message transmitted and/or received between the UE_A 10 and the SMF_A 230 via the AMF_A 240. Further, in the SM message, the PDU session establishment request message, the PDU session establishment accept message, the PDU session complete message, the PDU session reject message, the PDU session modification request message, the PDU session modification accept message, the PDU session modification reject message, and the like may be included. Further, in the procedure for session management, the PDU session establishment procedure, the PDU session modification procedure, and the like may be included. Further, in these procedures, the back-off timer value may be included for each message received by the UE_A 10. As the first timer, the UE may configure the back-off timer received from the NW, may configure a timer value using another method, or may configure a random value. Alternatively, in a case that multiple back-off timers received from the NW are configured, the UE may manage multiple "first timers" according to the multiple back-off timers, or may select one timer value out of the multiple back-off timer values received from the NW, based on a policy stored by the UE, configure as the first timer, and manage the timer. For example, in a case that two back-off timer values are received, the UE configures the back-off timer value received from the NW as "first timer #1" and "first timer #2", and manages the timers. Alternatively, one value may be selected from the multiple back-off timer values received form the NW, based on a policy stored by the UE, the value may be configured as the first timer and managed.

In a case that multiple back-off timer values are received from the NW, the UE_A 10 may manage multiple "first timers" according to the multiple back-off timers. Here, in order to distinguish the multiple "first timers" received by the UE_A 10, the multiple "first timers" may be hereinafter referred to as "first timer #1" or "first timer #2", for example. Note that the multiple back-off timers may be acquired in a single session management procedure, or may be acquired in other different session management procedures.

Here, the first timer may be a back-off timer for preventing reconnection, which is configured for multiple NW slices being associated based on the information for identifying one NW slice as described above or configured with the back-off timer for restraining reconnection or a combination of the APN/DNN and one NW slice being a unit. However, the first timer is not limited to the above, and may be a back-off timer for restraining reconnection, which is configured with a unit of a combination of the APN/DNN and multiple NW slices being associated based on the information for identifying one NW slice.

Re-attempt information according to the present embodiment is information for the network (NW) to indicate for the UE_A 10 whether reconnection is allowed by using the same identification information regarding the rejected PDU session. Note that the re-attempt information may be configured for each UTRAN access, E-UTRAN access, or NR access, or for each piece of slice information. In addition, for the re-attempt information specified with the access unit, reconnection to a network may be allowed on the assumption of access change. For the re-attempt information specified with the slice unit, slice information different from that for the rejected slice is specified, and reconnection using the specified slice information may be allowed.

A network slice association rule according to the present embodiment is a rule of associating information for identifying multiple network slices. Note that the network slice association rule may be received in the PDU session reject message, or may be configured for the UE_A 10 in advance. Further, for the network slice association rule, the newest rule in the UE_A 10 may be applied. Conversely, the UE_A 10 may perform a behavior based on the most recent network slice association rule. For example, in a case that a new network slice association rule is received in the PDU session reject message in a state in which the network slice association rule is configured for the UE_A 10 in advance, the UE_A 10 may update the network slice association rule stored in the UE_A 10.

A priority management rule of the back-off timer according to the present embodiment is a rule configured for the UE_A 10 in order to collectively manage multiple back-off timers occurring in multiple PDU sessions for one back-off timer. For example, in a case that a colliding or overlapping congestion management is applied and the UE stores multiple back-off timers, the UE_A 10 may collectively manage multiple back-off timers, based on the priority management rule of the back-off timers. Note that, regarding a pattern in which the colliding or overlapping congestion management occurs, in a case that congestion management based only on the DNN and congestion management based on both of the DNN and the slice information are simultaneously applied, the congestion management based only on the DNN is prioritized in this case. Note that the priority management rule for the back-off timer may not be limited thereto. Note that the back-off timer may be the first timer included in the PDU session reject message.

The first state according to the present embodiment is a state in which each apparatus has completed the registration procedure and the PDU session establishment procedure, and is a state in which one or more of the first to fourth congestion managements are applied for the UE_A 10 and/or each apparatus. Here, the UE_A 10 and/or each apparatus may be in a state (RM-REGISTERED state) in which the UE_A 10 is registered with the network, based on completion of the registration procedure, and the completion of the PDU session establishment procedure may be a state in which the UE_A 10 has received a PDU session establishment reject message from the network.

The congestion management according to the present embodiment includes one or multiple congestion managements out of the first congestion management to the fourth congestion management. Note that control of the UE by the NW is implemented by the first timer and the congestion management recognized by the UE, and the UE may store association of these pieces of information.

The first congestion management according to the present embodiment indicates control signal congestion management targeting a parameter of the DNN. For example, in the NW, in a case that congestion for DNN #A is detected and the NW recognizes a UE-initiated session management request targeting a parameter of only DNN #A, the NW may apply the first congestion management. Note that, also in a case that DNN information is not included in the UE-initiated session management request, the NW may select a default DNN as initiated by the NW and target congestion management. Alternatively, also in a case that the NW recognizes the UE-initiated session management request including DNN #A and S-NSSAI #A, the NW may apply the first congestion management. In a case that the first congestion management is applied, the UE may restrain the UE-initiated session management request targeting only DNN #A.

In other words, the first congestion management according to the present embodiment is control signal congestion management targeting the DNN, and may be congestion management caused by the fact that connectivity to the DNN is in a congested state. For example, the first congestion management may be congestion management for regulating all the connection to DNN #A in connectivity. Here, all the connection to DNN #A in connectivity may be connection of DNN #A in connectivity using any piece of S-NSSAI that can be used by the UE, or may be connection of DNN #A via the network slice that can be connected by the UE. Further, connectivity to DNN #A not using the network slice may be included.

The second congestion management according to the present embodiment indicates control signal congestion management targeting a parameter of the S-NSSI. For example, in the NW, in a case that control signal congestion for S-NSSAI #A is detected and the NW recognizes the UE-initiated session management request targeting a parameter of only S-NSSAI #A, the NW may apply the second congestion management. In a case that the second congestion management is applied, the UE may restrain the UE-initiated session management request targeting only S-NSSAI #A.

In other words, the first congestion management according to the present embodiment is control signal congestion management targeting the S-NSSAI, and may be congestion management caused by the fact that the network slice selected by the S-NSSAI is in a congested state. For example, the second congestion management may be congestion management for regulating all the connection based on S-NSSAI #A. In other words, the second congestion management may be congestion management for regulating all the connection to the DNN via the network slice selected with S-NSSAI #A.

The third congestion management according to the present embodiment indicates control signal congestion management targeting a parameter of the DNN and the S-NSSAI. For example, in the NW, in a case that control signal congestion for DNN #A and control signal congestion for S-NSSAI #A are simultaneously detected and the NW recognizes the UE-initiated session management request targeting a parameter of DNN #A and S-NSSAI #A, the NW may apply the third congestion management. Note that, also in a case that information indicating the DNN is not included in the UE-initiated session management request, the NW may select the default DNN as initiated by the NW and also target congestion management. In a case that the third congestion management is applied, the UE may restrain the UE-initiated session management request targeting the parameter of DNN #A and S-NSSAI #A.

In other words, the third congestion management according to the present embodiment may be control signal congestion management targeting a parameter of the DNN and the S-NSSAI, and may be congestion management caused by the fact that the connectivity to the DNN via the network slice selected based on the S-NSSAI is in a congested state. For example, the third congestion management may be congestion management for regulating connection to DNN #A in the connectivity based on S-NSSAI #A.

The fourth congestion management according to the present embodiment indicates control signal congestion management targeting at least one parameter of the DNN and/or the S-NSSAI. For example, in NW, in a case that control signal congestion for DNN #A and control signal congestion for S-NSSAI #A are simultaneously detected and the NW recognizes the UE-initiated session management request targeting at least one parameter of DNN #A and/or S-NSSAI #A, the NW may apply the fourth congestion management. Note that, also in a case that information indicating the DNN is not included in the UE-initiated session management request, the NW may select the default DNN as initiated by the NW and also target congestion management. In a case that the fourth congestion management is applied, the UE may restrain the UE-initiated session management request targeting at least one parameter of DNN #A and/or S-NSSAI #A.

In other words, the fourth congestion management according to the present embodiment may be control signal congestion management targeting a parameter of the DNN and the S-NSSAI, and may be congestion management caused by the fact that the network slice selected based on the S-NSSAI and the connectivity to the DNN are in a congested state. For example, the fourth congestion management may be congestion management for regulating all the connection based on S-NSSAI #A, and congestion management for regulating all the connection to DNN #A in connectivity. In other words, the fourth congestion management may be congestion management for regulating all the connection to the DNN via the network slice selected with S-NSSAI #A, and congestion management for regulating all the connection to DNN #A in connectivity. Here, all the connection to DNN #A in connectivity may be connection of DNN #A in connectivity using any piece of S-NSSAI that can be used by the UE, or may be connection of DNN #A via the network slice that can be connected by the UE. Further, connectivity to DNN #A not using the network slice may be included.

Thus, the fourth congestion management using DNN #A and S-NSSAI #A as a parameter may be congestion management for simultaneously performing the first congestion management using DNN #A as a parameter and the second congestion management using S-NSSAI #A as a parameter.

The 1st behavior according to the present embodiment is a behavior in which the UE stores the slice information transmitted in the first PDU session establishment request message in association with transmitted PDU session identification information. In the 1st behavior, the UE may store the slice information transmitted in the first PDU session establishment request message, or may store the slice information received in a case that the first PDU session establishment request is rejected.

The 2nd behavior according to the present embodiment is a behavior in which the UE transmits the PDU session establishment request for connecting to the same APN/DNN as that of the first PDU session establishment request by using other slice information that is different from the slice information specified in the first PDU session establishment. Specifically, the 2nd behavior may be a behavior in which, in a case that the back-off timer value received from the network is zero or invalid, the UE transmits the PDU session establishment request for connecting to the same APN/DNN as that of the first PDU session establishment request by using slice information other than the slice information specified in the first PDU session establishment. Alternatively, the 2nd behavior may be behavior in which, in a case that the first PDU session is rejected because radio access of a specific PLMN to which a specified APN/DNN is connected is not supported or the first PDU session is rejected for a temporary cause, the UE transmits the PDU session establishment request for connecting to the same APN/DNN as the APN/DNN included in the first PDU session establishment request by using slice information other than the slice information specified in the first PDU session establishment.

The 3rd behavior according to the present embodiment is a behavior in which the UE does not transmit a new PDU session establishment request using the same identification information until the first timer expires in a case that the PDU session establishment request is rejected. Specifically, the 3rd behavior may be a behavior in which the UE does not transmit a new PDU session establishment request using the same identification information until the first timer expires in a case that the back-off timer value received from the network is neither zero nor invalid. Alternatively, the 3rd behavior may be a behavior in which, in a case that another PLMN is selected or another NW slice is selected, and a rejection cause related to configuration failure of network operation is received and the back-off timer received in a case that the first PDU session establishment request is rejected is started, a new PDU session establishment request using the same identification information is not transmitted until the first timer expires.

Specifically, the PDU session in which a new PDU session establishment request in the 3rd behavior is not transmitted may be a PDU session to which the congestion management associated with the first timer is applied. To be more specific, the 3rd behavior may be a behavior in which the PDU session establishment request is not newly transmitted for the PDU session, which is connectivity according to a type of the congestion management associated with the first timer and uses the DNN and/or the S-NSSAI associated with the congestion management. Note that the processing prohibited for the UE in the present behavior may be the initiation of the procedure for session management including the PDU session establishment request and/or transmission and/or reception of the SM message.

The 4th behavior according to the present embodiment is a behavior in which, in a case that the PDU session establishment request transmitted on the Registration procedure is rejected, the UE does not transmit a new PDU session establishment request not carrying slice information and DNN/APN information until the first timer expires. Specifically, the 4th behavior may be a behavior in which, in a case that the back-off timer received by the UE from the network is neither zero nor invalid, the UE does not transmit a new PDU session establishment request not carrying the slice information and the DNN/APN information until the first timer expires.

The 5th behavior according to the present embodiment is a behavior in which, in a case that the PDU session establishment request is rejected, the UE does not transmit a new PDU session establishment request using the same identification information. Specifically, the 5th behavior may be a behavior in which, in a case that the PDP types supported in the UE and the network are different and are present in the equivalent PLMN, the UE does not transmit a new PDU session establishment request using the same identification information.

The 6th behavior according to the present embodiment is a behavior in which, in a case that the PDU session establishment request is rejected, the UE transmits a new PDU session establishment request as an initial procedure by using the same identification information. Specifically, the 6th behavior may be a behavior in which, in a case that the first PDU session establishment request is rejected because a target PDN session context is not present in handover from non-3GPP access, the UE transmits a new PDU session establishment request as an initial procedure by using the same identification information.

The 7th behavior according to the present embodiment may be a behavior in which, in a case that the UE selects another NW slice in a procedure of selecting the PLMN, the UE continues the received back-off timer in a case that a previous PDU session establishment request is rejected. Specifically, the 7th behavior may be a behavior in which, in a case that the UE performs PLMN selection in a case that the first PDU session establishment request is rejected and specification of an NW slice common to the NW slice specified in the first PDU session establishment request in the selected PLMN is possible, the UE continues the received back-off timer in a case that the first PDU session establishment request is rejected.

The 8th behavior according to the present embodiment is a behavior in which the UE configures a value reported from the network or a value configured for the UE in advance as the first timer value. Specifically, the 8th behavior may be a behavior in which the UE configures the back-off timer value received in the rejection report of the first PDU session establishment request as the first timer value, or may be a behavior in which the UE configures the value configured for or stored in the UE in advance as the first timer value. Note that the case that the timer configured for or stored in the UE in advance is configured as the first timer value may be limited to a case within a service area of an HPLMN or the equivalent PLMN.

The 9th behavior according to the present embodiment is a behavior in which, in a case that the PDU session establishment request is rejected, the UE does not transmit a new PDU session establishment request until terminal power on/off or insertion and/or removal of a Universal Subscriber Identity Module (USIM). Specifically, in the 9th behavior, in a case that the back-off timer received from the network is invalid or a PDP type is different between the UE and the network regarding the first PDU session rejection cause, the UE transmits no new PDU session establishment request until on/off of terminal power or USIM insertion and/or removal. Alternatively, the 9th behavior may be a behavior in which, in a case that the first PDU session is rejected because a specified APN/DNN is not supported in radio connection of a connected PLMN, and an information element of the back-off timer from the network is absent and the Re-attempt information is absent or PDU session reconnection to the equivalent PLMN is allowed, in the connected PLMN, a new PDU session establishment request is not transmitted until terminal power on/off or USIM insertion and/or removal. Alternatively, the 9th behavior may be a behavior in which, in a case that the first PDU session is rejected because a specified APN/DNN is not supported in radio connection of a connected PLMN, and an information element of the back-off timer from the network is absent and the Re-attempt information is absent or PDU session reconnection to the equivalent PLMN is not allowed, in the connected PLMN, a new PDU session establishment request is not transmitted until terminal power on/off or USIM insertion and/or removal. Alternatively, the 9th behavior may be a behavior in which, in a case that the first PDU session is rejected because a specified APN/DNN is not supported in radio connection of a connected PLMN and the back-off timer from the network is neither zero or invalid, a new PDU session establishment request is not transmitted until terminal power on/off or USIM insertion and/or removal. Alternatively, the 9th behavior may be a behavior in which, in a case that the first PDU session is rejected because a specified APN/DNN is not supported in radio connection of a connected PLMN and the back-off timer from the network is invalid, a new PDU session establishment request is not transmitted until terminal power on/off or USIM insertion and/or removal.

The 10th behavior according to the present embodiment is a behavior in which the UE transmits a new PDU session establishment request in a case that the PDU session establishment request is rejected. Specifically, the 10th behavior may be a behavior in which, in a case that the back-off timer received from the network is zero or the first PDU session establishment request is rejected for a temporary cause and further a back-off timer information element itself reported from the network is absent, the UE transmits a new PDU session establishment request. Alternatively, the 10th behavior may be a behavior in which, in a case that another PLMN is selected or another NW slice is selected, the first PDU session establishment request is rejected for a temporary cause, and the back-off timer is not started regarding a target APN/DNN with the selected PLMN or the back-off timer received from the network is invalid, a new PDU session establishment request is transmitted. Alternatively, the 10th behavior may be a behavior in which, in a case that the first PDU session establishment request is rejected because a PDP type of the UE and the network is different, Re-attempt information is not received or in a case that a different PLMN is selected or a PLMN absent in an equivalent PLMN list is selected, a PDP type is changed, or terminal power on/off or insertion and/or removal of the USIM is performed, a new PDU session establishment request is transmitted. Alternatively, the 10th behavior may be a behavior in which, in a case that the back-off timer whose report is received from the network is zero in a case that the first PDU session is rejected because a specified APN/DNN is not supported in radio connection of a connected PLMN, a new PDU session establishment request is transmitted.

The 11th behavior according to the present embodiment is a behavior in which the UE ignores the first timer and the Re-attempt information. Specifically, the 11th behavior may be a behavior in which, in a case that the first PDU session establishment request is rejected because a target PDN session context is not present in handover from non-3GPP access or the first PDU session establishment is rejected because the number of bearers provided in the PDN connection reaches a maximum allowable number, the UE ignores the first timer and the Re-attempt information.

The 12th behavior according to the present embodiment is a behavior in which the UE determines information for identifying associated multiple NW slices, based on information for identifying one NW slice received in the rejection report for the first PDU session establishment request, and the UE restrains reconnection to associated multiple NW slices, based on information for identifying one NW slice. Specifically, the 12th behavior may be a behavior in which the UE derives information for identifying another NW slice associated with information for identifying an NW slice reported in the first PDU session establishment request rejection based on the network slice association rule. Note that the network slice association rule may be configured for the UE in advance, or may be reported from the network in the rejection report of PDU session establishment.

The 13th behavior according to the present embodiment may be a behavior in which, in a case that multiple different congestion managements are started for one or multiple PDU session establishments by the same UE and multiple timers are provided from the network, the UE manages the timer(s), based on the priority management rule of the back-off timer(s). For example, the first PDU session establishment request of a combination of DNN_1 and slice_1 by the UE is regarded as a congestion management target based on both of the DNN and the slice information, and the UE receives first timer #1. In addition, the UE performs the second PDU session establishment request for a combination of DNN_1 and slice 2, which is regarded as a target of congestion management based only on the DNN, and receives first timer #2. In this case, regarding the UE, the behavior of PDU session reestablishment of the UE may be managed by prioritized first timer #2, based on the priority management rule of the back-off timer. Specifically, the value of the timer stored by the UE may be overwritten by a timer value generated by prioritized congestion control.

The 14th behavior according to the present embodiment may be a behavior in which, in a case that multiple different congestion managements are applied for one or multiple PDU session establishments by the same UE and multiple timers are provided from the network, the UE manages the timer for each session management instance (PDU session unit). For example, in a case that the first PDU session establishment of a combination of DNN #1 and slice #1 by the UE is regarded as a congestion target, based on both of the DNN and the slice information, the UE manages the timer value of the target back-off as first timer #1. Subsequently, in addition, in a case that the UE attempts PDU session establishment for a combination of DNN #1 and slice #2 as the second PDU session and it is regarded as a congestion target based only on the DNN, the UE manages the target back-off timer value as first timer #2. In this case, the UE manages multiple timers (here, first timer #1 and first timer #2) simultaneously. Specifically, the UE manages the timer in a session management instance/PDU session unit. Alternatively, in a case that the UE receives multiple timers simultaneously in one session management procedure, the UE simultaneously manages target back-off timers in an identified congestion management unit.

The 15th behavior according to the present embodiment may be a behavior in which the UE_A 10 performs the first identification processing of identifying which type of congestion management is to be applied out of the first congestion management to the fourth congestion management, and the second identification processing of identifying the DNN and/or the S-NSSAI associated with the congestion management to be applied. Note that the first identification processing may be identified based on one or more pieces of identification information out of at least the 1st identification information to the 4th identification information, and/or one or more pieces of identification information out of at least the 11th identification information to the 18th identification information. In a similar manner, the second identification processing may be identified based on one or more pieces of identification information out of at least the 1st identification information to the 4th identification information and/or one or more pieces of identification information out of at least the 11th identification information to the 18th identification information.

In the following, an example of the first identification processing will be described. In the first identification processing, the type of the congestion management to be applied in a case that any one or a combination of two or more of the following cases is satisfied may be identified as the first congestion management.

- Case that at least the 15th identification information is a value corresponding to the first congestion management
- Case that at least the 16th identification information is a value corresponding to the first congestion management
- Case that at least information indicating the first congestion management is included in the 14th identification information
- Case that at least only the DNN is included and the S-NSSAI is not included in the 17th identification information
- Case that at least the 16th identification information is not received in a case that the 16th identification information is information for identifying any piece of identification information out of the first congestion management and the second congestion management and is information in which only a value corresponding to the second congestion management can be configured for the 16th identification information
- Case that at least the 16th identification information is not received in a case that the 16th identification information is information for identifying any piece of identification information out of the first congestion management and the fourth congestion management and is information in which only a value corresponding to the fourth congestion management can be configured for the 16th identification information
- Case that at least the 16th identification information is not received in a case that the 16th identification information is information for identifying any piece of identification information out of the first congestion management, the second congestion management, and the fourth congestion management and is information in which only a value corresponding to the second congestion management and a value corresponding to the fourth congestion management can be configured for the 16th identification information Note that the above examples are not restrictive, and the UE_A 10 may identify based on one or more pieces of identification information out of at least the 1st identification information to the 4th identification information and/or one piece of identification information out of at least the 11th identification information to the 18th identification information or a combination of two or more pieces of the identification information.

In the first identification processing, the type of the congestion management to be applied in a case that any one or a combination of two or more of the following cases is satisfied may be identified as the second congestion management.

- Case that at least the 15th identification information is a value corresponding to the second congestion management
- Case that at least the 16th identification information is a value corresponding to the second congestion management
- Case that at least information indicating the second congestion management is included in the 14th identification information
- Case that at least only the S-NSSAI is included and the DNN is not included in the 17th identification information Case that at least the 16th identification information is not received in a case that the 16th identification information is information for identifying any piece of identification information out of the first congestion management and the second congestion management and is information in which only a value corresponding to the first congestion management can be configured for the 16th identification information Case that at least the 16th identification information is not received in a case that the 16th identification information is information for identifying any piece of identification information out of the second congestion management and the third congestion management and is information in which only a value corresponding to the third congestion management can be configured for the 16th identification information Case that at least the 16th identification information is not received in a case that the 16th identification information is information for identifying any piece of identification information out of the second congestion management, the third congestion management, and the fourth congestion management and is information in which only a value corresponding to the third congestion management and a value corresponding to the fourth congestion management can be configured for the 16th identification information Note that the above examples are not restrictive, and the UE_A 10 may identify based on one or more pieces of identification information out of at least the 1st identification information to the 4th identification information and/or one piece of identification information out of at least the 11th identification information to the 18th identification information or a combination of two or more pieces of the identification information.

In the first identification processing, the type of the congestion management to be applied in a case that any one or a combination of two or more of the following cases is satisfied may be identified as the third congestion management.

Case that at least the 15th identification information is a value corresponding to the third congestion management Case that at least the 16th identification information is a value corresponding to the third congestion management Case that at least information indicating the third congestion management is included in the 14th identification information Case that at least the 15th identification information is a value corresponding to multiple congestion managements including the third congestion management and not including the fourth congestion management, and the S-NSSAI and the DNN are included in the 17th identification information Case that at least the 16th identification information is not received in a case that the 16th identification information is information for identifying any piece of identification information out of the third congestion management and the fourth congestion management and is information in which only a value corresponding to the fourth congestion management can be configured for the 16th identification information Case that at least the 16th identification information is not received in a case that the 16th identification information is information for identifying any piece of identification information out of the second congestion management and the third congestion management and is information in which only a value corresponding to the second congestion management can be configured for the 16th identification information Case that at least the 16th identification information is not received in a case that the 16th identification information is information for identifying any piece of identification information out of the second congestion management, the third congestion management, and the fourth congestion management and is information in which only a value corresponding to the second congestion management and a value corresponding to the fourth congestion management can be configured for the 16th identification information Note that the above examples are not restrictive, and the UE_A 10 may identify based on one or more pieces of identification information out of at least the 1st identification information to the 4th identification information and/or one piece of identification information out of at least the 11th identification information to the 18th identification information or a combination of two or more pieces of the identification information.

In the first identification processing, the type of the congestion management to be applied in a case that any one or a combination of two or more of the following cases is satisfied may be identified as the fourth congestion management.

Case that at least the 15th identification information is a value corresponding to the fourth congestion management Case that at least the 16th identification information is a value corresponding to the fourth congestion management Case that at least information indicating the fourth congestion management is included in the 14th identification information Case that at least the 15th identification information is a value corresponding to multiple congestion managements including the fourth congestion management and not including the third congestion management, and the S-NSSAI and the DNN are included in the 17th identification information Case that at least the 16th identification information is not received in a case that the 16th identification information is information for identifying any piece of identification information out of the third congestion management and the fourth congestion management and is information in which only a value corresponding to the third congestion management can be configured for the 16th identification information Case that at least the 16th identification information is not received in a case that the 16th identification information is information for identifying any piece of identification information out of the second congestion management and the fourth congestion management and is information in which only a value corresponding to the second congestion management can be configured for the 16th identification information Case that at least the 16th identification information is not received in a case that the 16th identification information is information for identifying any piece of identification information out of the first congestion management and the fourth congestion management and is information in which only a value corresponding to the first congestion management can be configured for the 16th identification information Case that at least the 16th identification information is not received in a case that the 16th identification information is information for identifying any piece of identification information out of the second congestion management, the third congestion management, and the fourth congestion management and is information in which only a value corresponding to the second congestion management and a value corresponding to the third congestion management can be configured for the 16th identification information Case that at least the 16th identification information is not received in a case that the 16th identification information is information for identifying any piece of identification information out of the first congestion management, the second congestion management, and the fourth congestion management and is information in which only a value corresponding to the first congestion management and a value corresponding to the second congestion management can be configured for the 16th identification information Note that the above examples are not restrictive, and the UE_A 10 may identify based on one or more pieces of identification information out of at least the 1st identification information to the 4th identification information and/or one piece of identification information out of at least the 11th identification information to the 18th identification information or a combination of two or more pieces of the identification information, or may identify by using other means.

As described above, the type of congestion management may be identified through the first identification processing.

Next, an example of the second identification processing will be described. Note that the second identification processing may be processing for identifying the DNN and/or the S-NSSAI corresponding to the type of congestion management identified through the first identification processing.

To be more specific, the DNN corresponding to the first congestion management, the third congestion management, and the fourth congestion management may be determined based on the 12th identification information. And/or, the DNN corresponding to the first congestion management, the third congestion management, and the fourth congestion management may be determined based on the 17th identification information. And/or, the DNN corresponding to the first congestion management, the third congestion management, and the fourth congestion management may be determined based on the 2nd identification information.

Thus, the DNN corresponding to the first congestion management, the third congestion management, and the fourth congestion management may be the DNN indicated by the 12th identification information. And/or, the DNN corresponding to the first congestion management, the third congestion management, and the fourth congestion management may be the DNN included in the 17th identification information. And/or, the DNN corresponding to the first congestion management, the third congestion management, and the fourth congestion management may be the DNN indicated by the 2nd identification information.

Further, the S-NSSAI corresponding to the second congestion management, the third congestion management, and the fourth congestion management may be determined based on the 17th identification information. And/or, the DNN corresponding to the first congestion management, the third congestion management, and the fourth congestion management may be determined based on the 1st identification information.

Thus, the DNN corresponding to the first congestion management, the third congestion management, and the fourth congestion management may be the S-NSSAI indicated by the 17th identification information. And/or, the DNN corresponding to the first congestion management, the third congestion management, and the fourth congestion management may be the S-NSSAI included in the 1st identification information.

Note that the above examples are not restrictive, and the UE_A 10 may identify based on one or more pieces of identification information out of at least the 1st identification information to the 4th identification information and/or one piece of identification information out of at least the 11th identification information to the 18th identification information or a combination of two or more pieces of the identification information, or may identify by using other means.

Based on the 15th behavior described above, the UE_A 10 may identify the congestion management that the core network_B 190 applies to the UE_A 10. In other words, based on the 15th behavior, the UE_A 10 may identify a type of corresponding congestion management and a corresponding S-NSSAI and/or DNN as the congestion management to be applied. Note that the UE_A 10 may store one or multiple pieces of identification information out of the 1st identification information to the 4th identification information and the 11th identification information to the 18th identification information in association with the congestion management to be applied, and manage the identification information. Here, the 3rd identification information, and/or the 4th identification information, and/or the 13th identification information may be stored as information for identifying the congestion management to be applied, and may be managed.

The 16th behavior according to the present embodiment is a behavior of stopping the first timer in a case that an NW-initiated session management procedure is performed in a state in which the UE is running the first timer.

Here, for example, the 16th behavior may be a behavior of, in a case that multiple first timers are run, determining a first timer to be stopped out of multiple running first timers, based on the 21st identification information, and stopping the first timer. And/or, the 16th behavior may be a behavior of stopping the first timer associated with the congestion management identified with the 17th behavior. Note that, in a case that there are multiple congestion managements identified with the 17th behavior, the timer associated with each of the congestion managements may be stopped.

The 17th behavior according to the present embodiment may be a behavior for the UE of identifying a congestion management whose application is to be stopped out of one or multiple congestion managements applied by the UE, based on reception of a control message transmitted by the core network. For example, the UE may identify the congestion management whose application is to be stopped or changed, based on the 21st identification information.

Specifically, as described above, the UE stores the 3rd identification information, and/or the 4th identification information, and/or the 13th identification information and the like as information for identifying the congestion management in the fourth processing, and may identify the congestion management in which these pieces of identification information for the congestion management and the 13th identification information included in the 21st identification information match as the congestion management whose application is to be stopped.

And/or, the UE may identify the congestion management whose application is to be stopped, based on a combination of one or more of the 11th identification information to the 18th identification information included in the 21st identification information. Here, the details of an identification method may be similar to that for the identification processing in the 15th behavior to be described in the fourth processing in the PDU session establishment procedure example to be described later. In other words, the UE may identify the congestion management to be stopped by using a method similar to the method for identifying the congestion management to be applied.

Note that the UE may identify multiple congestion managements whose application is to be stopped. In the following, a method for identifying the second congestion management different from the first congestion management will be described, with the first congestion management being the congestion management identified by using the method described above.

For example, the UE may identify, as the second congestion management, the congestion management associated with the same DNN as the DNN associated with the first congestion management. And/or, the UE may identify, as the second congestion management, the congestion management associated with the same S-NSSAI as the S-NSSAI associated with the first congestion management. Note that identification of multiple congestion managements whose application is to be stopped may be configured so as to be performed only in a case that the first congestion management and/or the second congestion management is a specific type of congestion management.

Specifically, in a case that the first congestion management is any one of the first congestion management to the fourth congestion management, the UE may identify the second congestion management. And/or, in specification of the second congestion management, in a case that the congestion management as a search target is any one of the first congestion management to the fourth congestion management, the UE may identify the second congestion management. Note that with which type the first congestion management and/or the 2nd identification information can identify multiple congestion managements only needs to be configured in the core network and/or the UE in advance. Note that the specific type of congestion management allowed for identification may not be limited to only one type, and multiple types may be configured.

The 1st identification information according to the present embodiment is information for identifying the fact of belonging to the first NW slice. In other words, the 1st identification information may be information indicating that the UE desires establishment of a PDU session belonging to the first NW slice. Specifically, for example, the 1st identification information may be information for identifying the first NW slice. Note that the slice information may be identification information indicating specific S-NSSAI. Note that the 1st identification information may be information for identifying a specific NW slice in the operator A network, or may be information for identifying the same NW slice also in common to the operator B (operators other than the operator A). Further, the 1st identification information may be information for identifying the first NW slice configured from the HPLMN, may be information for identifying the first NW slice acquired from the AMF in the registration procedure, or may be information for identifying the first NW slice allowed from the network. Further, the 1st identification information may be information for identifying the first NW slice stored for each PLMN.

The 2nd identification information according to the present embodiment may be a Data Network Name (DNN), which may be information used for identification of a Data Network (DN).

The 3rd identification information according to the present embodiment may be a PDU Session ID, which may be information used for identification of a PDU Session.

The 4th identification information according to the present embodiment may be a Procedure Transaction Identity (PTI), which may be information for identifying transmissions and/or receptions of a series of messages in a specific session management procedure as a group, and further, information used for identifying and/or distinguishing transmissions and/or receptions of another series of session management-related messages.

The 11th identification information according to the present embodiment may be information indicating that a request for PDU session establishment or a request for PDU session modification is rejected. Note that the request for PDU session establishment or the request for PDU session modification is a request performed by the UE, and the DNN and/or the S-NSSAI is included. In other words, the 11th identification information may be information indicating that an establishment request or a modification request for the PDU session corresponding to these DNNs and/or S-NSSAs is rejected by the NW.

Further, the NW may indicate, for the UE, the congestion management by transmitting at least one piece of identification information out of the 12th identification information to the 18th identification information together with the 11th identification information to the UE. In other words, the NW may report to the UE the congestion management corresponding to a combination of one or multiple pieces of identification information out of the 12th identification information to the 18th identification information. On the other hand, the UE may identify the congestion management corresponding to the combination of one or multiple pieces of identification information out of the 12th identification information to the 18th identification information, and perform processing based on the identified congestion management. Specifically, the UE may start count of the first timer associated with the identified congestion management. Note that the timer value of the first timer may be determined by using the 14th identification information, a timer value configured by using another method such as a method of using a value stored in the UE in advance may be configured, or a random value may be configured.

The 12th identification information according to the present embodiment may be a DNN which is a DNN not allowed by the network, or may be information indicating that the DNN identified with the 2nd identification information has not been allowed. Further, the 12th identification information may be the same DNN as that of the 2nd identification information.

The 13th identification information according to the present embodiment may be a PDU Session ID and/or a PTI which is a PDU session ID and/or a PTI not allowed by the network, or may be information indicating that the PDU session ID and/or the PTI identified with the 3rd identification information has not been allowed. Further, the PDU Session ID of the 13th identification information may be the same PDU session ID as that of the 3rd identification information. Alternatively, the PTI of the 13th identification information may be the same PTI as that of the 4th identification information.

Here, the 13th identification information may be used as information for identifying the congestion management that the NW reports to the UE based on rejection of the PDU session establishment. In other words, the UE may store and manage the 13th identification information in association with the congestion management to be performed, based on the 15th behavior, and use it as information for identifying performed congestion management. Note that the information for identifying the congestion management may be configured with a combination with one or more pieces of identification information out of the 14th identification information to the 18th identification information in addition to the 13th identification information.

The 14th identification information according to the present embodiment may be information indicating a value of the back-off timer. In other words, the back-off timer may be a value indicating an effective period of the congestion management that the NW reports to the UE based on rejection of the PDU session establishment. In other words, the UE may use the 14th identification information as a value of the timer in the 15th behavior performed along with reception of the 14th identification information. Further, in the 14th identification information, information for identifying a type of congestion management may be included in addition to the timer value. Specifically, information for identifying the congestion management out of the first congestion management to the fourth congestion management may be included. For example, the information for identifying the congestion management type may be a timer name for identifying each congestion management, or may be a flag for identifying each congestion management. However, this is not restrictive. The congestion management type may be identified by using another method, such as by being identified based on positions stored in a control message or the like.

The 15th identification information according to the present embodiment is information indicating one or more Cause Values indicating a cause why the present procedure has been rejected. In other words, the cause value may be information indicating the congestion management that the NW applies to the present procedure, or may be information indicating a cause value for rejecting the present procedure that the NW applies other than the congestion management.

Note that the cause value may be information for identifying which congestion management out of the first congestion management to the fourth congestion management is indicated by the congestion management that the NW reports to the UE based on rejection of the PDU session establishment. In this case, according to each congestion management of the first congestion management to the fourth congestion management, the NW may transmit a different value to the UE as the cause value. The UE may be informed of the meaning of each value transmitted as the cause value in advance, and in the 15th behavior, the UE may identify whether the congestion management is the congestion management out of the first congestion management to the fourth congestion management, based on at least the 15th identification information.

Alternatively, the cause value may be information for identifying whether the congestion management that the NW reports to the UE based on rejection of the PDU session establishment is the first congestion management of the congestion management of any one of the second congestion management, the third congestion management, and the fourth congestion management. In this case, according to a case that the congestion management is the first congestion management and a case that the congestion management is the congestion management of any one of the second congestion management, the third congestion management, and the fourth congestion management, the NW may transmit a different value to the UE as the cause value. The UE may be informed of the meaning of each value transmitted as the cause value in advance, and in the 15th behavior, the UE may identify whether the congestion management is the first congestion management, or the second congestion management, the third congestion management, and the fourth congestion management, based on at least the 15th identification information.

Alternatively, the cause value may be information for identifying whether the congestion management that the NW reports to the UE based on rejection of the PDU session establishment is the first congestion management, the second congestion management, or the congestion management of any one of the third congestion management and the fourth congestion management. In this case, according to a case that the congestion management is the first congestion management, a case that the congestion management is the second congestion management, and a case that the congestion management is the congestion management of any one of the third congestion management and the fourth congestion management, the NW may transmit a different value to the UE as the cause value. The UE may be informed of the meaning of each value transmitted as the cause value in advance, and in the 15th behavior, the UE may identify whether the congestion management is the first congestion management, the second congestion management, the congestion management of any one of the third congestion management and the fourth congestion management, based on at least the 15th identification information.

Alternatively, the cause value may be information for identifying whether the congestion management that the NW reports to the UE based on rejection of the PDU session establishment is the first congestion management or the second congestion management, or the third congestion management or the fourth congestion management. In this case, according to a case that the congestion management is the first congestion management or the second congestion management, and a case that the congestion management is the third congestion management or the fourth congestion management, the NW may transmit a different value to the UE as the cause value. The UE may be informed of the meaning of each value transmitted as the cause value in advance, and in the 15th behavior, the UE may identify whether the congestion management is the first congestion management or the second congestion management, or the third congestion management or the fourth congestion management, based on at least the 15th identification information.

Alternatively, the cause value may be information for identifying whether the congestion management that the NW reports to the UE based on rejection of the PDU session establishment is the second congestion management or the third congestion management, or the first congestion management or the fourth congestion management. In this case, according to a case that the congestion management is the second congestion management or the third congestion management, and a case that the congestion management is the first congestion management or the fourth congestion management, the NW may transmit a different value to the UE as the cause value. The UE may be informed of the meaning of each value transmitted as the cause value in advance, and in the 15th behavior, the UE may identify whether the congestion management is the second congestion management or the third congestion management, or the first congestion management or the fourth congestion management, based on at least the 15th identification information.

Alternatively, the cause value may be information for identifying whether the congestion management that the NW reports to the UE based on rejection of the PDU session establishment is the second congestion management or the fourth congestion management, or the first congestion management or the third congestion management. In this case, according to a case that the congestion management is the second congestion management or the fourth congestion management, and a case that the congestion management is the first congestion management or the third congestion management, the NW may transmit a different value to the UE as the cause value. The UE may be informed of the meaning of each value transmitted as the cause value in advance, and in the 15th behavior, the UE may identify whether the congestion management is the second congestion management or the fourth congestion management, or the first congestion management or the third congestion management, based on at least the 15th identification information.

Alternatively, the cause value may be information indicating that the NW performs the congestion management for the UE, based on rejection of the PDU session establishment. In other words, the cause value may be information for causing the UE to perform any one of the first congestion management to the fourth congestion management. In this case, the cause value need not be information with which a specific congestion management can be identified.

Note that, in the present embodiment, in a case that the third congestion management is not performed, the meaning corresponding to the third congestion management in the cause value in the 15th identification information described above is unnecessary, and the cause value in the 15th identification information may be a cause value obtained by removing the processing, description, and meaning related to the third congestion management from the above description. Further, in the present embodiment, in a case that the fourth congestion management is not performed, the meaning corresponding to the fourth congestion management in the cause value in the 15th identification information described above is unnecessary, and the cause value in the 15th identification information may be a cause value obtained by removing the processing, description, and meaning related to the fourth congestion management from the above description.

The 16th identification information according to the present embodiment is one or more pieces of identifier (Indication) information indicating that the present procedure has been rejected. In other words, the Indication information may be information indicating the congestion management that the NW applies to the present procedure. The NW may indicate the congestion management that the NW applies, based on the 16th identification information.

For example, the Indication information may be information indicating which congestion management the NW regulates for the UE in two or more congestion managements out of the first congestion management to the fourth congestion management. Thus, the NW may transmit a value associated with regulation management to be applied to the UE as the Indication information. The UE may be informed of the meaning of each value transmitted as the Indication information in advance, and in the 15th behavior, the UE may identify the congestion management out of the first congestion management to the fourth congestion management, based on at least the 16th identification information. Here, the two or more congestion managements out of the first congestion management to the fourth congestion management may be the congestion management capable of identification using the Indication information, and the congestion management to be an identification target may be all of the four congestion managements, may be the first congestion management and the second congestion management, may be the third congestion management and the fourth congestion management, may be the second congestion management to the fourth congestion management, or may be another freely selected combination.

Note that the Indication information need not necessarily require a value corresponding to each of all of the congestion managements to be an identification target. For example, in a case that the value of the Indication information is assigned to be associated with each of the congestion managements other than congestion management A, the value of the Indication information need not necessarily be configured for the congestion management A. In this case, the NW and the UE can identify that the congestion management is the first congestion management, based on the fact that the Indication information is not transmitted and/or received. Note that the congestion management A may be any congestion management out of the first congestion management to the fourth congestion management.

Alternatively, there may be a case that the congestion management is reported to the UE based on transmission of the PDU session establishment reject message, a case that Identification is included according to a type of congestion management of the first congestion management to the fourth congestion management, and a case that the Identification is not included. In other words, the NW may use the Identification information as the information indicating the congestion management depending on a type of congestion management, or may use other identification information as the information indicating the congestion management without using the Identification information depending on a type of congestion management.

Note that, in the present embodiment, in a case that the third congestion management is not performed, the meaning corresponding to the third congestion management in the Indication information in the 16th identification information described above is unnecessary, and the Indication information in the 16th identification information may be a cause value obtained by removing the processing, description, and meaning related to the third congestion management from the above description. Further, in the present embodiment, in a case that the fourth congestion management is not performed, the meaning corresponding to the fourth congestion management in the Indication information in the 16th identification information described above is unnecessary, and the Indication information in the 16th identification information may be a cause value obtained by removing the processing, description, and meaning related to the fourth congestion management from the above description.

The 17th identification information according to the present embodiment is one or more pieces of Value information indicating that the present procedure has been rejected. In other words, the Value information may be information indicating the congestion management that the NW applies to the present procedure. Note that the 17th identification information may be information including at least one of identification information for identifying one or multiple NW slices included in the 18th identification information and/or the 12th identification information.

The NW may indicate the congestion management that the NW applies, based on the 17th identification information. In other words, the NW may indicate which congestion management out of the first congestion management to the fourth congestion management is applied, based on the 17th identification information. Further, the NW may indicate the DNN and/or the S-NSSAI to be a target of the congestion management applied to the UE based on transmission of the PDU session reject message, based on the 17th identification information. For example, in a case that the 17th identification information is only DNN #1, it may be indicated that the first congestion management targeting DNN #1 is applied. In a case that the 17th identification information is only S-NSSAI #1, it may be indicated that the second congestion management targeting S-NSSAI #1 is applied. In a case that the 17th information is configured with DNN #1 and S-NSSAI #1, it may be indicated that the third congestion management or the fourth congestion management targeting at least one of DNN #1 and/or S-NSSAI #1 is applied.

Note that the 17th identification information need not necessarily be information with which congestion management out of the first congestion management to the fourth congestion management is applied can be identified, and the 17th identification information may be information indicating the DNN and/or the S-NSSAI to be a target of the congestion management identified with other means such as by being identified based on other identification information.

The 18th identification information according to the present embodiment may be information indicating that a request for establishment of a PDU session belonging to the first NW slice has been rejected, or may be information indicating that a request for establishment of a PDU session belonging to the first NW slice or a request for PDU session modification has not been allowed. Here, the first NW slice may be an NW slice determined using the 1st identification information, or may be a different NW slice. Further, the 18th identification information may be information indicating that establishment of a PDU session belonging to the first NW slice in the DN identified using the 12th identification information is not allowed, or may be information indicating that establishment of a PDU session belonging to the first NW slice in a PDU session identified using the 13th identification information is not allowed. Further, the 11th identification information may be information indicating that establishment of a PDU session belonging to the first slice is not allowed in a registration area and/or a tracking area to which the UE_A 10 currently belongs, or may be information indicating that establishment of a PDU session belonging to the first NW slice in an access network connected by the UE_A 10 is not allowed. In addition, the 11th identification information may be identification information for identifying one or multiple NW slices for determining the NW slice to which the rejected PDU session request belongs. In addition, the 18th identification information may be, in a case that the UE switches the connection destination to EPS, identification information indicating auxiliary information for a radio access system to select an appropriate MME. Note that the auxiliary information may be information indicating the DCN ID. In addition, the 18th identification information may be a network slice association rule being a rule for associating multiple pieces of slice information.

The 21st identification information according to the present embodiment may be information for stopping one or multiple first timers run by the UE, or may be information indicating the first timer to be stopped out of the first timers run by the UE. Specifically, the 21st identification information may be information indicating the 13th identification information stored by the UE in association with the first timer. Further, the 21st identification information may be information indicating at least one piece out of the 12th identification information to the 18th identification information that the UE stores in association with the first timer.

Further, the 21st identification information may be information for changing the association between the first timer stored by the UE and the information indicating at least one piece out of the 13th identification information to the 17th identification information. For example, in a case that an NW-initiated session management request including the 21st identification information allowing connection to DNN #A is received in a case that the first timer for restraining the UE-initiated session management of a combination of DNN #A and S-NSSAI #A is run, the UE changes an association target of the running timer to only S-NSSAI #A, and may recognize that the UE-initiated session management request for DNN #A has been allowed. In other words, the 21st identification information may be information indicating that the congestion management applied in a case of reception of the 21st identification information is changed to another congestion management out of the first to fourth congestion managements.

Figure 9:
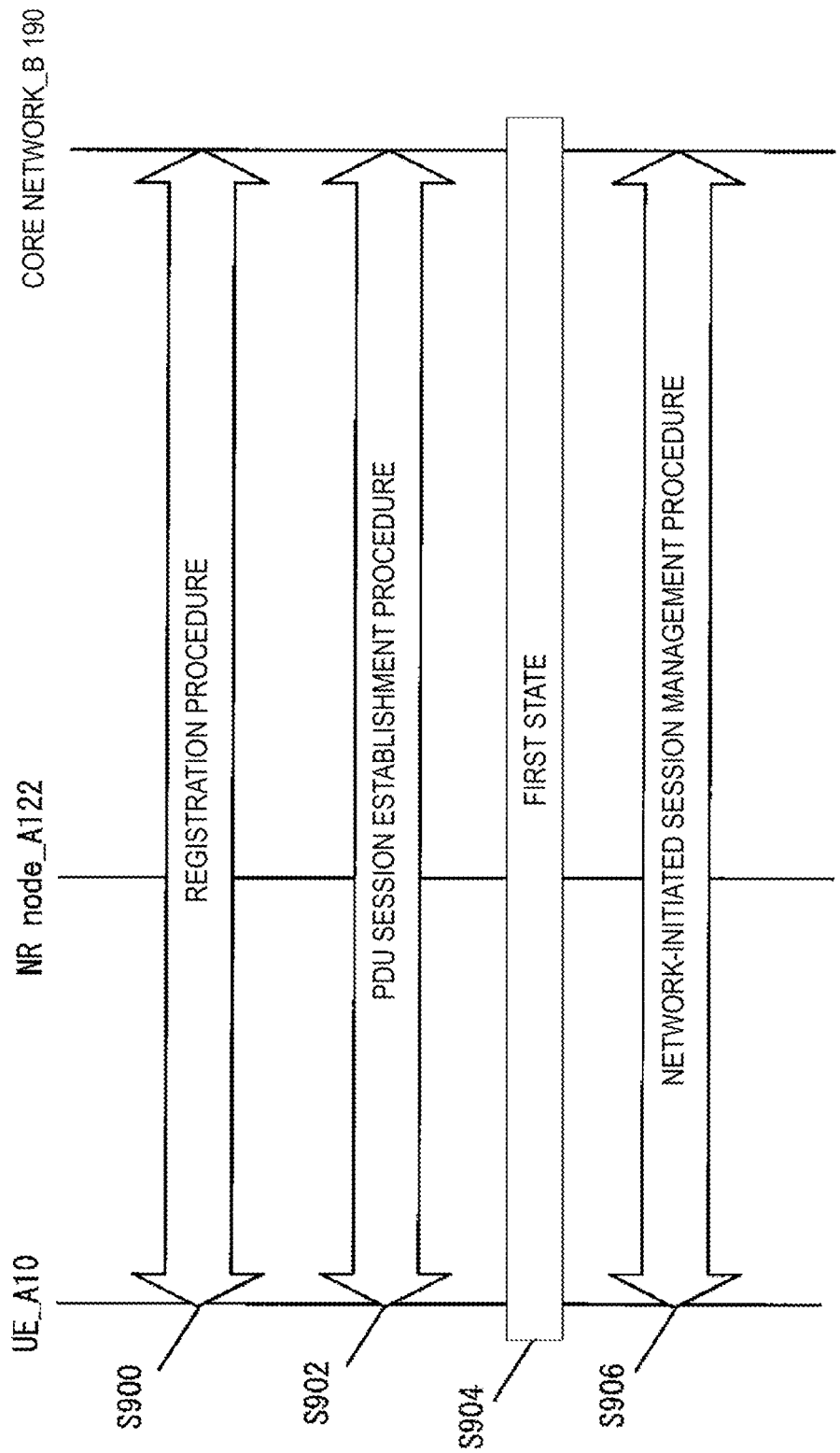
FIG. 9 is a diagram illustrating an initial procedure.

Next, an initial procedure according to the present embodiment will be described with reference to FIG. 9. In the following, the initial procedure is also referred to as the present procedure, and the present procedure includes a Registration procedure, a PDU session establishment procedure, and a network-initiated session management procedure. The details of the registration procedure, the PDU session establishment procedure, and the network-initiated session management procedure will be described later.

Specifically, by performing the registration procedure by each apparatus (S900), the UE_A 10 transitions to a state registered with the network (RM-REGISTERED state). Next, by performing the PDU session establishment procedure by each apparatus (S902), the UE_A 10 establishes the PDU session with the DN_A 5 that provides the PDU connection service via the core network_B 190 and a state between each apparatus transitions to the first state (S904). Note that this PDU session is assumed to be established via the access network and the UPF_A 235, but is not limited thereto. That is, a UPF (UPF_C 239) different from the UPF_A 235 may be present between the UPF_A 235 and the access network. At this time, the PDU session is established via the access network, the UPF_C 239, and the UPF_A 235. Next, each apparatus in the first state may perform the network-initiated session management procedure at any timing (S906).

Note that each apparatus may exchange various pieces of capability information and/or various pieces of request information of each apparatus in the registration procedure and/or the PDU session establishment procedure and/or the network-initiated session management procedure. Further, in a case that each apparatus performs exchange of various pieces of information and/or negotiation of various requests in the registration procedure, each apparatus may or may not perform the exchange of various pieces of information and/or the negotiation of various requests in the PDU session establishment procedure and/or the network-initiated session management procedure. Further, in a case that each apparatus does not perform the exchange of various pieces of information and/or the negotiation of various requests in the registration procedure, each apparatus may perform the exchange of various pieces of information and/or the negotiation of various requests in the PDU session establishment procedure and/or the network-initiated session management procedure. Further, even in a case that each apparatus performs the exchange of various pieces of information and/or the negotiation of various requests in the registration procedure, each apparatus may perform the exchange of various pieces of information and/or the negotiation of various requests in the PDU session establishment procedure and/or the network-initiated session management procedure.

In addition, each apparatus may perform the PDU session establishment procedure in the registration procedure or after the registration procedure is completed. Furthermore, in a case that the PDU session establishment procedure is performed in the registration procedure, the PDU session establishment request message included in the registration request message may be transmitted and/or received, and the PDU session establishment accept message included in the registration accept message may be transmitted and/or received, a PDU session establishment complete message included in a registration complete message may be transmitted and/or received, and a PDU session establishment reject message included in a registration reject message may be transmitted and/or received. Further, in a case that the PDU session establishment procedure is performed in the registration procedure, each apparatus may establish the PDU session based on completion of the registration procedure, or may transition to a state in which the PDU session is established with each apparatus.

Furthermore, each apparatus involved in the present procedure may transmit and/or receive each control message described in the present procedure to transmit and/or receive one or more pieces of identification information included in each control message and store each piece of identification information transmitted and/or received as a context.

1.3.1. Overview of Registration Procedure

First, the following describes the overview of the registration procedure. The registration procedure is a procedure initiated by the UE_A 10 to register with the network (the access network, and/or the core network_B 190, and/or the DN_A 5). In a state in which the UE_A 10 is not registered in the network, the UE_A 10 can perform the present procedure at any timing such as the timing of turning on power. In other words, the UE_A 10 may initiate the present procedure at any timing in a non-registered state (RM-DEREGISTERED state). In addition, each apparatus may transition to a registered state (RM-REGISTERED state), based on the completion of the registration procedure.

Furthermore, the present procedure may be a procedure for updating location registration information of the UE_A 10 in the network, for regularly notifying a state of the UE_A 10 from the UE_A 10 to the network, and/or for updating particular parameters related to the UE_A 10 in the network.

The UE_A 10 may initiate the present procedure in a case that the UE_A 10 applies mobility across TAs. In other words, the UE_A 10 may initiate the present procedure in a case that the UE_A 10 moves to a TA different from a TA indicated in a TA list that the UE_A 10 holds. Furthermore, the UE_A 10 may initiate the present procedure in a case that a running timer expires. Furthermore, the UE_A 10 may initiate the present procedure in a case that a context of each apparatus needs to be updated due to disconnection or disablement (also referred to as deactivation) of a PDU session. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, besides the above, the UE_A 10 can perform the present procedure at any timing as long as a PDU session is established.

1.3.1.1. Example of Registration Procedure

Figure 10:
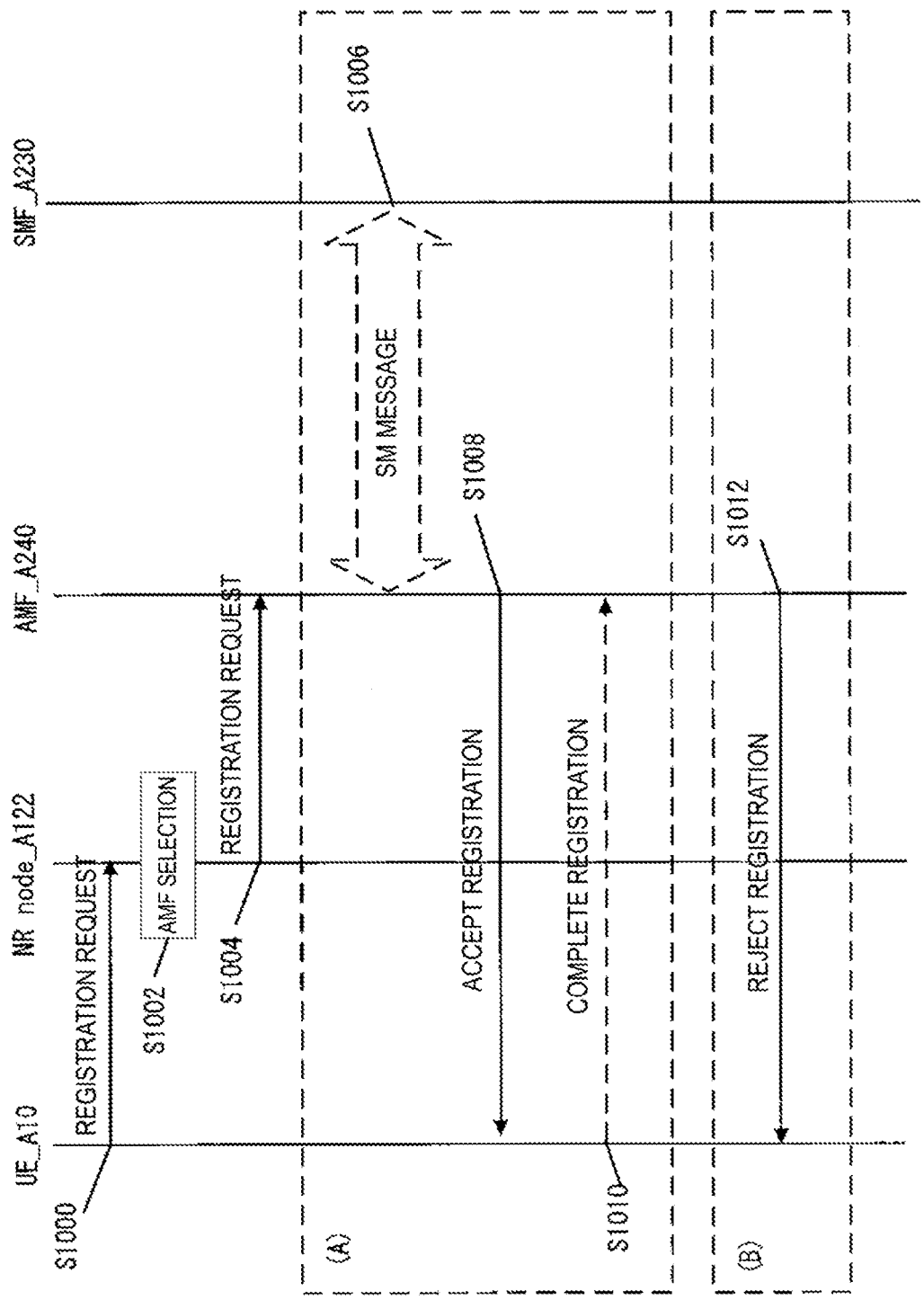
FIG. 10 is a diagram illustrating a registration procedure.

An example procedure of performing the registration procedure will be described with reference to FIG. 10. In this section, the present procedure refers to the registration procedure. Each step of the present procedure will be described below.

First, the UE_A 10 transmits a Registration Request message to the AMF_A 240 via the NR node (also referred to as a gNB) A 122 and/or the ng-eNB (S1000) (S1002) (S1004), and thereby initiates the registration procedure. In addition, the UE_A 10 may transmit a Session Management (SM) message (e.g., a PDU session establishment request message) included in the registration request message, or may transmit the SM message (e.g., the PDU session establishment request message) along with the registration request message to initiate a procedure for the session management (SM), such as a PDU session establishment procedure, during the registration procedure.

Specifically, the UE_A 10 transmits a Radio Resource Control (RRC) message including the registration request message to the NR node_A 122 and/or the ng-eNB (S1000). In a case that the NR node_A 122 and/or the ng-eNB receives the RRC message including the registration request message, the NR node_A 122 and/or the ng-eNB extracts the registration request message out of the RRC message and selects the AMF_A 240 as an NF or a common CP function to which the registration request message is routed (S1002). Here, the NR node_A 122 and/or the ng-eNB may select the AMF_A 240, based on information included in the RRC message. The NR node_A 122 and/or the ng-eNB transmits or transfers the registration request message to the selected AMF_A 240 (S1004).

Note that the registration request message is a Non-Access-Stratum (NAS) message transmitted and/or received on the N1 interface. Further, the RRC message is a control message transmitted and/or received between the UE_A 10 and the NR node_A 122 and/or the ng-eNB. Further, the NAS message is processed in the NAS layer, and the RRC message is processed in the RRC layer, and the NAS layer is a layer higher than the RRC layer.

In addition, in a case that there are multiple NSIs requesting registration, the UE_A 10 may transmit a registration request message for each of the NSIs, or may transmit multiple registration request messages included in one or more RRC messages. Furthermore, the above-described multiple registration request messages included in one or more RRC messages may be transmitted as one registration request message.

In a case that the AMF_A 240 receives the registration request message and/or a control message different from the registration request message, the AMF_A 240 performs the first condition determination. The first condition determination is intended to determine whether or not the AMF_A 240 accepts the request of the UE_A 10. In the first condition determination, the AMF_A 240 determines whether the first condition determination is true or false. The AMF_A 240 initiates the procedure of (A) in the present procedure in a case that the first condition determination is true (that is, in a case that the network accepts the request of the UE_A 10), and initiates the procedure of (B) in the present procedure in a case that the first condition determination is false (that is, in a case that the network does not accept the request of the UE_A 10).

As follows, steps in a case that the first condition determination is true, in other words, each step of the procedure of (A) in the present procedure will be described. The AMF_A 240 performs a fourth condition determination, and initiates the procedure of (A) in the present procedure. The fourth condition determination is to determine whether the AMF_A 240 transmits and/or receives the SM message to/from the SMF_A 230. In other words, the fourth condition determination may be intended to determine whether or not the AMF_A 240 performs the PDU session establishment procedure in the present procedure. The AMF_A 240 performs selection of the SMF_A 230 and transmission and/or reception of the SM message to and/or from the selected SMF_A 230 in a case that the fourth condition determination is true (that is, in a case that the AMF_A 240 performs transmission and/or reception of the SM message to and/or from the SMF_A 230), and omits such operations in a case that the fourth condition determination is false (that is, in a case that the AMF_A 240 does not perform transmission and/or reception of the SM message to and/or from the SMF_A 230) (S1006). Note that in a case that the AMF_A 240 receives an SM message indicating rejection from the SMF_A 230, the AMF_A 240 may terminate the procedure of (A) in the present procedure, and may initiate the procedure of (B) in the present procedure.

In addition, the AMF_A 240 transmits the Registration Accept message to the UE_A 10 via the NR node_A 122 based on the reception of the registration request message from the UE_A 10 and/or the completion of the transmission and/or reception of the SM message to/from the SMF_A 230 (S1008). For example, in a case that the fourth condition determination is true, the AMF_A 240 may transmit a registration accept message, based on reception of the registration request message from the UE_A 10. Further, in a case that the fourth condition determination is false, the AMF_A 240 may transmit a registration accept message, based on completion of transmission and/or reception of the SM message to and/or from the SMF_A 230. Here, the registration accept message may be transmitted as a response message to the registration request message. Further, the registration accept message is a NAS message transmitted and/or received in the N1 interface, and for example, the AMF_A 240 may transmit the message as a control message of the N2 interface to the NR node_A 122, and the NR node_A 122 that has received the message may include the message in an RRC message and transmit the message to the UE_A 10.

Further, in a case that the fourth condition determination is true, the AMF_A 240 may transmit the SM message (for example, the PDU session establishment accept message) included in the registration accept message, or may transmit the SM message (for example, the PDU session establishment accept message) along with the registration accept message. This transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF_A 240 may indicate that the procedure for SM has been accepted by performing such a transmission method.

The UE_A 10 receives a registration accept message via the NR node_A 122 (S1008). The UE_A 10 receives the registration accept message and recognizes the contents of various types of identification information included in the registration accept message.

Next, the UE_A 10 transmits a Registration Complete message to the AMF_A 240, based on reception of the registration accept message (S1010). Note that, in a case that the UE_A 10 has received an SM message such as a PDU session establishment accept message, the UE_A 10 may transmit the SM message such as the PDU session establishment complete message included in the registration complete message, or may include the SM message therein to indicate that the procedure for SM is completed. Here, the registration complete message may be transmitted as a response message to the registration accept message. Further, the registration complete message is a NAS message transmitted and/or received in the N1 interface, and for example, the UE_A 10 may include the message in an RRC message and transmit the message to the NR node_A 122, and the NR node_A 122 that has received the message may transmit the message as a control message of the N2 interface to the AMF_A 240.

The AMF_A 240 receives the registration complete message (S1010). In addition, each apparatus completes the procedure of (A) in the present procedure based on the transmission and/or reception of the registration accept message and/or the registration complete message.

Next, steps in a case that the first condition determination is false, that is, each step of the procedure of (B) in the present procedure, will be described. The AMF_A 240 transmits a Registration Reject message to the UE_A 10 via the NR node_A 122 (S1012) to initiate the procedure of (B) in the present procedure. Here, the registration reject message may be transmitted as a response message to the registration request message. Further, the registration reject message is a NAS message transmitted and/or received in the N1 interface, and for example, the AMF_A 240 may transmit the message as a control message of the N2 interface to the NR node_A 122, and the NR node_A 122 that has received the message may include the message in an RRC message and transmit the message to the UE_A 10. Further, the registration reject message transmitted by the AMF_A 240 is not limited thereto as long as it is a message for rejecting the request of the UE_A 10.

Note that the procedure of (B) in the present procedure may be initiated in a case that the procedure of (A) in the present procedure is terminated. In a case that the fourth condition determination is true in the procedure of (A), the AMF_A 240 may transmit an SM message such as a PDU session establishment reject message indicating rejection in the registration reject message, or may include the SM message indicating rejection therein to indicate that the procedure for SM has been rejected. In that case, the UE_A 10 may further receive the SM message, such as the PDU session establishment reject message, that indicates rejection, or may recognize that the procedure for SM has been rejected.

Furthermore, the UE_A 10 may recognize that a request of the UE_A 10 has been rejected by receiving the registration reject message or not receiving the registration accept message. Each apparatus completes the procedure of (B) in the present procedure based on the transmission and/or reception of the registration reject message.

Each apparatus completes the present procedure (registration procedure), based on the completion of the procedure of (A) or (B) in the present procedure. Note that each apparatus may transition to a state in which the UE_A 10 is registered with the network (RM_REGISTERED state) based on the completion of the procedure of (A) in the present procedure, or may maintain a state in which the UE_A 10 is not registered with the network (RM_DEREGISTERED state) based on the completion of the procedure of (B) in the present procedure. Transition to each state of each apparatus may be performed based on completion of the present procedure, or may be performed based on an establishment of a PDU session.

Furthermore, each apparatus may perform processing based on identification information transmitted and/or received in the present procedure, based on completion of the present procedure.

Furthermore, the first condition determination may be performed based on identification information, and/or subscriber information, and/or an operator policy included in the registration request message. For example, the first condition determination may be true in a case that the network allows a request of the UE_A 10. In addition, the first condition determination may be false in a case that the network does not allow a request of the UE_A 10. Furthermore, the first condition determination may be true in a case that the network of a destination of registration of the UE_A 10 and/or an apparatus in the network supports a function requested by the UE_A 10, and may be false in a case that the network and/or the apparatus does not support the function. Further, the first condition determination may be true in a case that the network determines that it is a congested state, and may be false in a case that the network determines that it is not a congested state. Note that conditions for determining whether the first condition determination is true or false may not be limited to the above-described conditions.

The fourth condition determination may also be performed based on whether AMF_A 240 has received an SM and may be performed based on whether a SM message is included in the registration request message. For example, the fourth condition determination may be true in a case that the AMF_A 240 has received the SM and/or the SM message is included in the registration request message, and may be false in a case that the AMF_A 240 has not received the SM and/or the SM message is not included in the registration request message. Note that conditions for determining whether the fourth condition determination is true or false may not be limited to the above-described conditions.

1.3.2. Overview of PDU Session Establishment Procedure

Next, an overview of the PDU session establishment procedure performed to establish a PDU session with the DN_A 5 will be described. The PDU session establishment procedure is also referred to as a present procedure below. The present procedure is a procedure for each apparatus to establish the PDU session. Note that each apparatus may perform the present procedure in a state in which the registration procedure is completed or during the registration procedure. In addition, each apparatus may initiate the present procedure in a registered state, or may initiate the present procedure at any timing after the registration procedure. Each apparatus may establish the PDU session, based on completion of the PDU session establishment procedure. Furthermore, each apparatus may perform the present procedure multiple times to establish multiple PDU sessions.

1.3.2.1. Example of PDU Session Establishment Procedure

Figure 11:
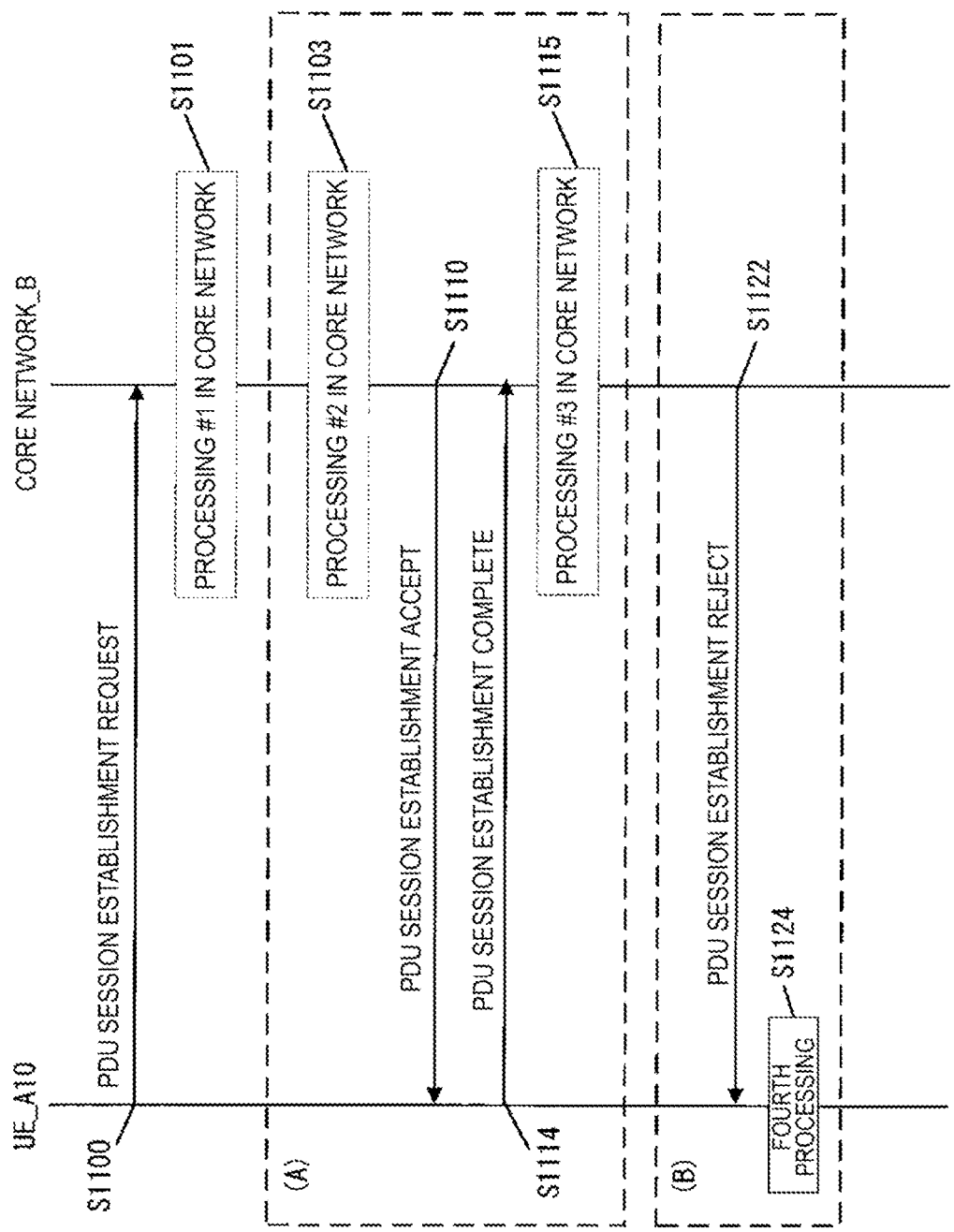
FIG. 11 is a diagram illustrating a PDU session establishment procedure.

With reference to FIG. 11, an example of a procedure of performing a PDU session establishment procedure will be described. Each step of the present procedure will be described below. First, the UE_A 10 transmits the PDU Session Establishment Request message to the core network_B via the access network_B (S1100), and thereby initiates the PDU session establishment procedure.

Specifically, the UE_A 10 transmits the PDU session establishment request message to the AMF_A 240 in the core network_B 190 via the NR node_A 122 by using the N1 interface (S1100). The AMF_A receives the PDU session establishment request message, and performs the third condition determination, The third condition determination is intended to determine whether or not the AMF_A accepts the request of the UE_A 10. In the third condition determination, the AMF_A determines whether the fifth condition determination is true or false. The core network_B starts processing #1 in the core network in a case that the third condition determination is true (S1101), and initiates the procedure of (B) in the present procedure in a case that the third condition determination is false. Note that the steps in the case that the third condition determination is false will be described later. Here, processing #1 in the core network may be SMF selection by the AMF_A in the core network_B 190 and/or transmission and/or reception of the PDU session establishment request message between the AMF_A and the SMF_A.

The core network_B 190 starts processing #1 in the core network. In processing #1 in the core network, the AMF_A 240 may select the SMF_A 230 as an NF to which the PDU session establishment request message is routed, and transmit or transfer the PDU session establishment request message to the selected SMF_A 230 by using the N11 interface. Here, the AMF_A 240 may select the SMF_A 230 of the routing destination based on the information included in the PDU session establishment request message. To be more specific, the AMF_A 240 may select the SMF_A 230 of the routing destination based on each piece of identification information acquired based on the reception of the PDU session establishment request message, and/or the subscriber information, and/or the capability information of the network, and/or the operator policy, and/or the state of the network, and/or the context already held by the AMF_A 240.

Note that the PDU session establishment request message may be a NAS message. The PDU session establishment request message only needs to be a message requesting the PDU session establishment and not limited to this.

Here, the UE_A 10 may include one or more pieces of identification information out of the 1st identification information to the 4th identification information in a PDU session establishment request message, or may indicate a request of the UE_A 10 by including these pieces of identification information. Note that two or more pieces of identification information out of these pieces of identification information may be configured as one or more pieces of identification information.

Further, by transmitting the 1st identification information, and/or the 2nd identification information, and/or the 3rd identification information, and/or the 4th identification information included in the PDU session establishment request message, the UE_A 10 may request establishment of the PDU session belonging to the network slice, may indicate the network slice to which the PDU session belongs that is requested by the UE_A 10, or may indicate the network slice to which the PDU session is to belong.

To be more specific, by transmitting the 1st identification information and the 2nd identification information being associated with each other, in the PDU session established for the DN identified with the 2nd identification information, the UE_A 10 may request establishment of the PDU session belonging to the network slice, may indicate the network slice to which the PDU session belongs that is requested by the UE_A 10, or may indicate the network slice to which the PDU session is to belong.

Further, by transmitting two or more pieces of identification information out of the 1st identification information to the 4th identification information in combination, the UE_A 10 may perform a request combining the events described above. Note that the events indicated by the UE_A 10 through transmission of each of the pieces of the identification information need not be limited to these.

Note that the UE_A 10 may determine which piece of identification information out of the 1st identification information to the 4th identification information is to be included in the PDU session establishment request message, based on the capability information of the UE_A 10, and/or the policy such as the UE policy, and/or the preference of the UE_A 10, and/or the application (higher layer). Note that the determination performed by the UE_A 10 as to which piece of identification information is to be included in the PDU session establishment request message is not limited to the determination described above.

The SMF_A 230 in the core network_B 190 receives the PDU session establishment request message and performs the third condition determination. The third condition determination is to determine whether or not the SMF_A 230 accepts the request of the UE_A 10. In the third condition determination, the SMF_A 230 determines whether the third condition determination is true or false. In a case that the third condition determination is true, the SMF_A 230 initiates the procedure of (A) in the present procedure, and in a case that the third condition determination is false, the SMF_A 230 initiates the procedure of (B) in the present procedure. Note that steps in the case that the third condition determination is false will be described later.

As follows, steps in a case that the third condition determination is true, that is, each step of the procedure of (A) in the present procedure, will be described. The SMF_A 230 selects the UPF_A 235 with which the PDU session is to be established, and performs the eleventh condition determination.

Here, the eleventh condition determination is intended to determine whether or not each apparatus performs processing #2 in the core network. Here, processing #2 in the core network may include initiation and/or execution of a PDU session establishment authentication procedure by each apparatus, and/or transmission and/or reception of a Session Establishment request message between the SMF_A and the UPF_A in the core network_B 190, and/or transmission and/or reception of a Session Establishment response message, and the like (S1103). In the eleventh condition determination, the SMF_A 230 determines whether the eleventh condition determination is true or false. The SMF_A 230 initiates a PDU session establishment authentication approval procedure in a case that the eleventh condition determination is true, and omits the PDU session establishment authentication approval procedure in a case that the eleventh condition determination is false. Note that the details of the PDU session establishment authentication approval procedure of processing #2 in the core network will be described later.

Next, based on the eleventh condition determination and/or completion of the PDU session establishment authentication approval procedure, the SMF_A 230 transmits the session establishment request message to the selected UPF_A 235, and initiates the procedure of (A) in the present procedure. Note that, based on completion of the PDU session establishment authentication approval procedure, the SMF_A 230 may initiate the procedure of (B) in the present procedure without initiating the procedure of (A) in the present procedure.

Here, the SMF_A 230 may select one or more UPFs_A 235 based on each piece of identification information acquired based on the reception of the PDU session establishment request message, and/or the capability information of the network, and/or the subscriber information, and/or the operator policy, and/or the state of the network, and/or the context already held by the SMF_A 230. Note that in a case that multiple UPFs_A 235 are selected, the SMF_A 230 may transmit the session establishment request message to each UPF_A 235.

The UPF_A 235 receives the session establishment request message and creates a context for the PDU session. Further, the UPF_A 235 transmits the session establishment response message to the SMF_A 230, based on reception of the session establishment request message and/or creation of the context for the PDU session. Furthermore, the SMF_A 230 receives a session establishment response message. Note that the session establishment request message and the session establishment response message may be control messages transmitted and/or received on the N4 interface. Further, the session establishment response message may be a response message to the session establishment request message.

Further, the SMF_A 230 may assign an address to be assigned to the UE_A 10 based on the reception of the PDU session establishment request message and/or the selection of the UPF_A 235 and/or the reception of the session establishment response message. Note that the SMF_A 230 may assign the address to be assigned to the UE_A 10 during the PDU session establishment procedure, or may assign the address after the completion of the PDU session establishment procedure.

Specifically, in a case that the SMF_A 230 assigns the IPv4 address without using the DHCPv4, the SMF_A 230 may assign the address during the PDU session establishment procedure or may transmit the assigned address to the UE_A 10. In addition, in a case that the SMF_A 230 assigns the IPv4 address, and/or the IPv6 address, and/or the IPv6 prefix using the DHCPv4 or the DHCPv6 or Stateless Address Autoconfiguration (SLAAC), the SMF_A 230 may assign the address after the PDU session establishment procedure or may transmit the assigned address to the UE_A 10. Note that the address allocation performed by SMF_A 230 is not limited to these.

Further, based on completion of address assignment of an address to be assigned to the UE_A 10, the SMF_A 230 may transmit the assigned address included in the PDU session establishment accept message to the UE_A 10, or may transmit the assigned address to the UE_A 10 after completion of the PDU session establishment procedure.

The SMF_A 230 transmits the PDU session establishment accept message to the UE_A 10 via the AMF_A 240, based on the reception of the PDU session establishment request message, and/or the selection of the UPF_A 235, and/or the reception of the session establishment response message, and/or the completion of the address assignment of the address to be assigned to the UE_A 10 (S1110).

Specifically, the SMF_A 230 transmits the PDU session establishment accept message to the AMF_A 240 using the N11 interface, and the AMF_A 240 that has received the PDU session establishment accept message transmits the PDU session establishment accept message to the UE_A 10 using the N1 interface.

Note that in a case that the PDU session is PDN connection, the PDU session establishment accept message may be a PDN connectivity accept message. Furthermore, the PDU session establishment accept message may be a NAS message transmitted and/or received on the N11 interface and the N1 interface. The PDU session establishment accept message is not limited to the PDU session establishment accept message described above, and only needs to be a message indicating the acceptance of the establishment of the PDU session.

The UE_A 10 receives the PDU session establishment accept message from the SMF_A 230. By receiving the PDU session establishment accept message, the UE_A 10 recognizes the details of various pieces of identification information included in the PDU session establishment accept message.

Next, based on completion of reception of the PDU session establishment accept message, the UE_A 10 transmits a PDU session establishment complete message to the SMF_A 230 via the AMF_A 240 (S1114). Furthermore, the SMF_A 230 receives the PDU session establishment complete message, and performs the second condition determination.

Specifically, the UE_A 10 transmits the PDU session establishment complete message to the AMF_A 240 using the N1 interface, and the AMF_A 240 that has received the PDU session establishment complete message transmits the PDU session establishment complete message to the SMF_A 230 using the N11 interface.

Note that in a case that the PDU session is PDN connection, the PDU session establishment complete message may be a PDN Connectivity complete message, or may be an Activate default EPS bearer context accept message. Furthermore, the PDU session establishment complete message may be a NAS message transmitted and/or received on the N1 interface and the N11 interface. The PDU session establishment complete message only needs to be a response message to the PDU session establishment accept message. However, the PDU session establishment complete message is not limited to this, and only needs to be a message indicating that the PDU session establishment procedure is completed.

The second condition determination is intended to determine a type of the message on the N4 interface to be transmitted and/or received by the SMF_A 230. In a case that the second condition determination is true, processing #3 in the core network may be started (S1115). Here, processing #3 in the core network may include transmission and/or reception of a Session Modification request message, and/or transmission and/or reception of a Session Modification response message, and the like. The SMF_A 230 transmits the session modification request message to the UPF_A 235, and further receives the session modification accept message transmitted by the UPF_A 235 that has received the session modification request message. Further, in a case that the second condition determination is false, the SMF_A 230 performs processing #2 in the core network. Specifically, the SMF_A transmits the session establishment request message to the UPF_A 235, and further receives the session modification accept message transmitted by the UPF_A 235 that has received the session establishment request message.

Each apparatus completes the procedure of (A) in the present procedure, based on the transmission and/or reception of the PDU session establishment complete message, and/or the transmission and/or reception of a session modification response message, and/or the transmission and/or reception of the session establishment response message, and/or the transmission and/or reception of the Router Advertisement (RA).

Next, steps in a case that the third condition determination is false, that is, each step of the procedure of (B) in the present procedure, will be described. The SMF_A 230 transmits the PDU session establishment reject message to the UE_A 10 via the AMF_A 240 (S1122), and initiates the procedure of (B) in the present procedure.

Specifically, the SMF_A 230 transmits the PDU session establishment reject message to the AMF_A 240 using the N11 interface, and the AMF_A 240 that has received the PDU session establishment request message transmits the PDU session establishment reject message to the UE_A 10 using the N1 interface.

Note that in a case that the PDU session is PDN connection, the PDU session establishment reject message may be a PDN connectivity reject message. Furthermore, the PDU session establishment reject message may be a NAS message transmitted and/or received on the N11 interface and the N1 interface. The PDU session establishment reject message is not limited to the PDU session establishment reject message described above, and only needs to be a message indicating that the PDU session establishment has been rejected.

Here, the SMF_A 230 may include one or more pieces of identification information out of the 11th identification information to the 18th identification information in the PDU session establishment reject message, or may indicate that the request of the UE_A 10 has been rejected by including these pieces of identification information. Note that two or more pieces of identification information out of these pieces of identification information may be configured as one or more pieces of identification information.

Further, by transmitting the 11th identification information, and/or the 12th identification information, and/or the 13th identification information, and/or the 14th identification information, and/or the 15th identification information, and/or the 16th identification information, and/or the 17th identification information, and/or the 18th identification information included in the PDU session establishment reject message, the SMF_A 230 may indicate that the request for establishment of the PDU session belonging to the network slice has been rejected, or may indicate that the network slice to which the PDU session is not allowed to belong.

To be more specific, by transmitting the 18th identification information and the 12th identification information being associated with each other, in the PDU session established for the DN identified with the 12th identification information, the SMF_A 230 may indicate that the request for establishment of the PDU session belonging to the network slice has been rejected, or may indicate that the network slice to which the PDU session is not allowed to belong.

Further, by transmitting the 18th identification information included in the PDU session establishment reject message, in the registration area and/or the tracking area to which the UE_A 10 currently belongs, the SMF_A 230 may indicate that the request for establishment of the PDU session belonging to the network slice has been rejected, or may indicate that the network slice to which the PDU session is not allowed to belong.

Further, by transmitting the 18th identification information included in the PDU session establishment reject message, in the access network to which the UE_A 10 is currently connected, the SMF_A 230 may indicate that the request for establishment of the PDU session belonging to the network slice has been rejected, or may indicate that the network slice to which the PDU session is not allowed to belong.

Further, by transmitting the 11th identification information and/or the 14th identification information included in the PDU session establishment reject message, the SMF_A 230 may indicate the value of the first timer, or may indicate whether or not the same procedure as the present procedure should be performed again after completion of the present procedure.

Further, by transmitting two or more pieces of identification information out of the 11th identification information to the 18th identification information in combination, the SMF_A 230 may perform a request combining the events described above. Note that the events indicated by the SMF_A 230 through transmission of each of the pieces of the identification information need not be limited to these.

Note that the SMF_A 230 may determine which piece of identification information out of the 11th identification information to the 18th identification information is to be included in the PDU session establishment reject message, based on the received identification information, and/or the capability information of the network, and/or the policy such as the operator policy, and/or the state of the network.

Further, the 12th identification information may be information indicating the same DNN as the DNN indicated by the 2nd identification information. Further, the 13th identification information may be information indicating the same PDU session ID as the PDU session ID indicated by the 3rd identification information. Further, the 18th identification information may be information transmitted in a case that the 1st identification information is received and/or in a case that the network slice indicated by the 1st identification information is not allowed by the network. Note that determination performed by the SMF_A 230 as to which piece of identification information is to be included in the PDU session establishment reject message is not limited to the determination described above.

As described above, the core network_B 190 reports the congestion management to be applied to the UE_A 10 by transmitting the PDU session reject message. Note that, in this manner, the core network_B 190 may report that the congestion management is applied to the UE_A 10, and/or the congestion management is performed for the UE_A 10, and/or information for identifying a type of congestion management to be applied, and/or information for identifying a target of the congestion management such as the DNN and/or the S-NSSAI corresponding to the congestion management to be applied, and/or a value of a timer associated with the congestion management to be applied.

Here, each piece of information described above may be information identified with one or more pieces of identification information out of the 11th identification information to the 18th identification information.

The PDU session establishment reject message received by the UE_A 10 from the SMF_A 230 may include one or multiple pieces of identification information out of the 11th identification information to the 18th identification information.

Next, the UE_A 10 performs the fourth processing, based on reception of the PDU session establishment reject message (S1124). Further, the UE_A 10 may perform the fourth processing, based on completion of the present procedure.

In the following, the first example of the fourth processing will be described.

Here, the fourth processing may be processing in which the UE_A 10 recognizes an event indicated by the SMF_A 230. Further, the fourth processing may be processing in which the UE_A 10 stores the received identification information as a context, or may be processing in which the UE_A 10 transfers the received identification information to a higher layer and/or a lower layer. Further, the fourth processing may be processing in which the UE_A 10 recognizes that a request of the present procedure has been rejected.

Further, in a case that the UE_A 10 receives the 14th identification information and the 11th identification information, the fourth processing may be processing in which the UE_A 10 configures a value indicated by the 14th identification information to the first timer value, or may be processing in which the UE_A 10 starts the first timer configured with the timer value. Further, in a case that the UE_A 10 receives the 11th identification information, the fourth processing may be processing of performing one or more behaviors out of the 1st behavior to the 11th behavior.

Further, in a case that the UE_A 10 receives the 18th identification information and the 11th identification information, the fourth processing may be processing in which the UE_A 10 performs the 12th behavior, based on information for identifying the NW slice included in the 18th identification information and a network slice association rule included in the 18th identification information or a network slice association rule stored and configured by the UE_A 10 in advance.

Further, in a case that the UE_A 10 receives multiple pieces of the 14th identification information and the 11th identification information, the fourth processing may be processing in which the UE_A 10 performs the 13th behavior, based on multiple first timers included in each piece of the 14th identification information and a priority management rule of the back-off timer stored by the UE_A 10.

Further, in a case that the UE_A 10 receives multiple pieces of the 14th identification information and the 11th identification information, the fourth processing may be processing in which the UE_A 10 performs the 14th behavior, based on multiple first timers included in each piece of the 14th identification information.

Here, the 12th behavior to the 15th behavior may be the congestion management initiated and performed by the UE_A 10, based on a rule and/or a policy in the UE_A 10. Specifically, for example, the UE_A 10 may include, in a storage unit and/or a controller in the UE_A 10, a policy (UE policy) and/or a rule, a management function for the policy and/or the rule, a policy enforcer for causing the UE_A 10 to operate based on the policy and/or the rule, one or multiple applications, and a session management instance (session manager) for one or multiple PDU sessions that are established based on a request from each application or that attempt the establishment, and may implement the congestion management initiated by the UE_A 10 by performing any one of the 12th behavior to the 15th behavior as the fourth processing, based on these. Here, the policy and/or the rule may include any one or more of the network slice association rule and/or the priority management rule of the back-off timer and/or a Network Slice Selection Policy (NSSP), and in addition, these may be configured for the UE_A 10 in advance, or may be received from the network. Further, here, the policy enforcer may be an NSSP enforcer. Further, here, the application may be a protocol in the application layer, or may establish a PDU session or attempt the establishment based on a request from the protocol of the application layer. Further, here, the session management instance may be a software element dynamically generated in the PDU session unit. Further, here, as internal processing of the UE_A 10, the S-NSSAI may be grouped, or processing based on the grouping of the S-NSSAI may be performed. Note that the configuration and the processing in the UE_A 10 may not be limited to these, and each element may be implemented with software, or may be performed as software processing in the UE_A 10.

Further, the UE_A 10 may switch to the EPS in the fourth processing or based on completion of the fourth processing, or may start location registration in the EPS based on the DCN ID included in the 18th identification information. Note that the switch of the UE_A 10 to the EPS may be based on a handover procedure, or may be RAT switch initiated by the UE_A 10. Further, in a case that the UE_A 10 receives the 18th identification information including the DCN ID, the UE_A 10 may perform switch to the EPS in the fourth processing or after completion of the fourth processing.

Further, the fourth processing may be processing in which the UE_A 10 initiates the present procedure again after a certain period, or may be processing in which the UE_A 10 transitions to a state in which a request of the UE_A 10 is limited or restricted.

Note that the UE_A 10 may transition to the first state, along with completion of the fourth processing.

Next, the second example of the fourth processing will be described.

Here, the fourth processing may be processing in which the UE_A 10 recognizes an event indicated by the SMF_A 230. Further, the fourth processing may be processing in which the UE_A 10 stores the received identification information as a context, or may be processing in which the UE_A 10 transfers the received identification information to a higher layer and/or a lower layer.

Further, in the fourth processing, processing of identifying that the congestion management is applied may be performed, based on one or more pieces of identification information out of the 11th identification information to the 18th identification information.

Further, in the fourth processing, processing of identifying which type of congestion management out of the first congestion management to the fourth congestion management is applied and processing of identifying the DNN and/or the S-NSSAI associated with the congestion management to be applied may be performed, based on one or more pieces of identification information out of the 11th identification information to the 18th identification information. To be more specific, the present processing may be processing described in the 15th behavior.

Further, in the fourth processing, a value configured for the first timer indicated by the 14th identification information associated with the congestion management to be applied may be identified and configured, and count of the first timer may be started, based on one or more pieces of identification information out of the 11th identification information to the 18th identification information. To be more specific, the present processing may be processing described in the 8th behavior.

Further, in the fourth processing, one or more of the 1st behavior to the 7th behavior may be performed along with start or completion of any processing described above.

Further, in the fourth processing, one or more of the 9th behavior to the 15th behavior may be performed along with start or completion of any processing described above.

Note that the UE_A 10 may transition to the first state, along with completion of the fourth processing.

In the above, processing details have been described by using the first example and the second example regarding the fourth processing, the processing need not be limited to these processings of the fourth processing. For example, the fourth processing may be processing of a combination of a part of multiple detailed processings described in the first example and a part of multiple detailed processings described in the second example.

Further, by receiving the PDU session establishment reject message or by not receiving the PDU session establishment accept message, the UE_A 10 may recognize that the request of the UE_A 10 has been rejected. Each apparatus completes the procedure of (B) in the present procedure, based on transmission and/or reception of the PDU session establishment reject message.

Each apparatus completes the present procedure, based on completion of the procedure of (A) or (B) in the present procedure. Note that each apparatus may transition to a state in which the PDU session is established, based on the completion of the procedure of (A) in the present procedure. Each apparatus may recognize that the present procedure has been rejected, may transition to a state in which the PDU session is not established, or may transition to the first state, based on the completion of the procedure of (B) in the present procedure.

Furthermore, each apparatus may perform processing based on identification information transmitted and/or received in the present procedure, based on completion of the present procedure. In other words, based on completion of the present procedure, the UE_A 10 may perform the fourth processing, or may transition to the first state after completion of the fourth processing.

The third condition determination may be performed based on the identification information included in the PDU session establishment request message, and/or the subscriber information, and/or the operator policy. For example, the third condition determination may be true in a case that the network allows a request of the UE_A 10. In addition, the third condition determination may be false in a case that the network does not allow a request of the UE_A 10. Furthermore, in a case that the network as the connection destination of the UE_A 10 and/or the apparatus in the network supports the function requested by the UE_A 10, the third condition determination may be true, and in a case that the function is not supported, the third condition determination may be false. Further, the third condition determination may be true in a case that the network determines that it is a congested state, and may be false in a case that the network determines that it is not a congested state. Note that conditions for determining whether the third condition determination is true or false may not be limited to the above-described conditions.

The second condition determination may be performed based on whether the session on the N4 interface for the PDU session has been established. For example, in a case that the session on the N4 interface for the PDU session has been established, the second condition determination may be true, and in a case that the session on the N4 interface for the PDU session is not established, the second condition determination may be false. Note that conditions for determining true or false of the second condition determination need not be limited to the above-described conditions.

The eleventh condition determination may be performed based on the identification information included in the PDU session establishment request message, and/or the subscriber information, and/or the operator policy. For example, the eleventh condition determination may be true in a case that the network allows an operation that the authentication and/or approval by the DN_A 5 is performed in the present procedure. Further, the eleventh condition determination may be false in a case that the network does not allow an operation that authentication and/or approval by the DN_A 5 is performed in the present procedure. Further, the eleventh condition determination may be true in a case that the network of the connection destination of the UE_A 10 and/or the apparatus in the network supports the operation that the authentication and/or approval by the DN_A 5 is performed in the present procedure, and may be false in a case that the network of the connection destination of the UE_A 10 and/or the apparatus in the network does not support the operation. Further, the eleventh condition determination may be true in a case that the 61st identification information is received, and may be false in a case that the 61st identification information is not received. In other words, the eleventh condition determination may be true in a case that a container including information and/or multiple pieces of information such as an SM PDU DN Request Container is received, and may be false in a case that the container is not received. Note that the condition for determining the true and false of the eleventh condition determination need not be limited to the conditions described above.

In transmission and/or reception of the PDU session reject message in the procedure described above, the core network_B 190 reports the congestion management to be applied to the UE_A 10, and the UE_A 10 can apply the congestion management indicated by the core network_B 190. Note that the core network_B 190 and the UE_A 10 may apply multiple congestion managements by performing the procedure and the processing described in the present procedure multiple times. Note that each congestion management to be applied may be a different type of congestion management, and/or congestion management corresponding to a different DNN, and/or congestion management corresponding to different S-NNSAI, and/or congestion management having a difference in a combination of the DNN and the S-NSSAI.

1.3.3. Overview of Network-Initiated Session Management Procedure

Next, an overview of the network-initiated session management procedure will be described. In the following, the network-initiated session management procedure may also be referred to as the present procedure. The present procedure is a procedure for session management initiated and performed by the network for an established PDU session. Note that the present procedure may be performed at any timing after the registration procedure and/or the PDU session establishment procedure described above has completed and each apparatus has transitioned to the first state. Further, each apparatus may transmit and/or receive a message including the identification information for stopping or changing the congestion management in the present procedure, or may start the behavior based on new congestion management that is indicated by the network based on completion of the present procedure.

Alternatively, the UE_A 10 may stop application of the congestion management identified based on the control information transmitted and/or received in the present procedure. In other words, the core network_B 190 can notify the UE_A 10 to stop application of the congestion management that can be identified using these pieces of control information, by initiating the present procedure and further by transmitting the control message and the control information of the present procedure to the UE_A 10.

Note that the present procedure may be a network-initiated PDU session modification procedure and/or a network-initiated PDU session release procedure, or the like, and network-initiated session management procedures not limited to these may be performed. Note that each apparatus may transmit and/or receive a PDU session modification message in the network-initiated PDU session modification procedure, or may transmit and/or receive a PDU session release message in the network-initiated PDU session release procedure.

1.3.3.1. First Network-Initiated Session Management Procedure Example

Figure 12:
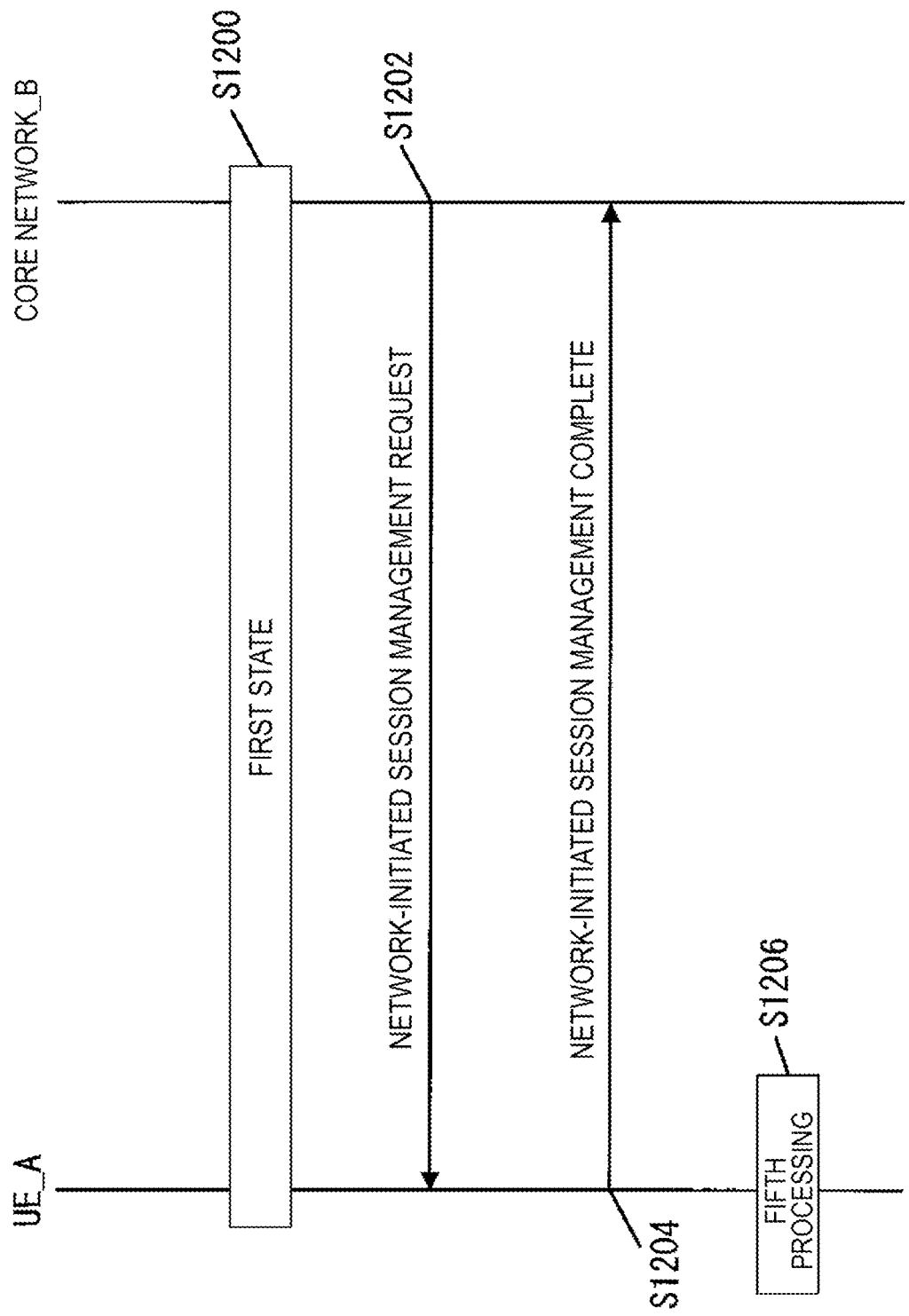
FIG. 12 is a diagram illustrating a network-initiated session management procedure.

With reference to FIG. 12, an example of the network-initiated session management procedure will be described. In this section, the present procedure refers to the network-initiated session management procedure. In the following, each step of the present procedure will be described.

As described above, the UE_A 10 and each apparatus in the core network_B 190 that have transitioned to the first state (S1200) based on completion of the registration procedure and/or PDU session establishment procedure initiates the network-initiated session management procedure at any timing. Here, the apparatus in the core network_B 190 that initiates the present procedure may be the SMF_A and/or the AMF_A, and the UE_A may transmit and/or receive a message in the present procedure via the AMF_A and/or the access network_B.

Specifically, the apparatus in the core network_B 190 transmits a network-initiated session management request message to the UE_A (S1202). Here, the apparatus in the core network_B 190 may include the 21st identification information in the network-initiated session management request message, or may indicate a request of the core network_B 190 by including the identification information.

Next, the UE_A that has received the network-initiated session management request message transmits a network-initiated session management complete message (S1204). Further, based on the 21st identification information received from the core network_B 190, the UE_A may perform the fifth processing (S1206), and complete the present procedure. Further, the UE_A 10 may perform the fifth processing, based on completion of the present procedure.

In the following, an example of the fifth processing will be described.

Here, the fifth processing may be processing in which the UE_A 10 recognizes an event indicated by the core network_B 190, or may be processing in which the UE_A 10 recognizes a request of the core network_B 190. Further, the fifth processing may be processing in which the UE_A 10 stores the received identification information as a context, or may be processing in which the UE_A 10 transfers the received identification information to a higher layer and/or a lower layer.

Further, the message transmitted and/or received in the network-initiated session management request may be a PDU session modification command (PDU SESSION MODIFICATION COMMAND), may be a PDU session release command (PDU SESSION RELEASE COMMAND), or may not be limited to these.

Note that the UE_A 10 may perform congestion management identification processing applied by the UE_A 10, based on the received 21st identification information in the fifth processing. Here, the congestion management identification processing may be the 17th behavior.

In addition, the fifth processing may be the 16th behavior in a case that the UE_A 10 receives the 21st identification information. Specifically, for example, the fifth processing may be processing of stopping one or multiple timers performed based on the fourth processing described above.

In other words, the UE_A 10 that has received the 21st identification information performs stop or change of the identified congestion management by performing the 17th behavior to identify the congestion management to be subjected to stop or change indicated by the network and then performing the 16th behavior.

Further, each apparatus may perform processing based on the identification information transmitted and/or received in the present procedure, based on completion of the present procedure. In other words, the UE_A 10 may perform the fifth processing, based on completion of the present procedure, or may complete the present procedure after completion of the fifth processing.

In the procedure described above, through transmission and/or reception of the network-initiated session management request message, the core network_B 190 can indicate, for the UE_A 10, stop or change of the congestion management that the UE_A 10 has already applied. Further, the UE_A 10 can perform stop or change of the congestion management applied by the UE_A 10, based on the network-initiated session management request message. Here, in a case that the UE_A 10 applies one or more congestion managements, the congestion management to be subjected to stop or change may be identified based on reception of the identification information included in the network-initiated session management request message from the core network_B 190. Note that each congestion management to be applied may be a different type of congestion management, and/or congestion management corresponding to a different DNN, and/or congestion management corresponding to different S-NNSAI, and/or congestion management having a difference in a combination of the DNN and the S-NSSAI.

1.3.3.2. Second Network-Initiated Session Management Procedure Example

The first network-initiated session management procedure example described in Section 1.3.3. describes an example of stopping the congestion management in the procedure regardless of which congestion management out of the first to fourth congestion managements the congestion management applied to the UE_A 10 is.

This is not restrictive, and the procedure described in the first network-initiated session management procedure example described in Section 1.3.3.1 may be a procedure performed according to the congestion management. For example, the procedure may be a procedure performed for the congestion management that is classified into the first congestion management, the third congestion management, and the fourth congestion management out of one or multiple congestion managements applied by the UE_A 10.

In other words, the UE_A 10 may stop the congestion management corresponding to the first congestion management, the third congestion management, and the fourth congestion management in the fifth processing.

In a case that the UE 10 receives the network-initiated session management request message for the second congestion management while the count of the back-off timer associated with the second congestion management is performed, the UE_A 10 may respond to the core network_B 190 without stopping the back-off timer associated with the second congestion management.

In other words, in a case that the UE_A 10 receives the network-initiated session management request message for congested S-NSSAI #A and any DNN while the UE_A 10 performs the count of the back-off timer associated with S-NSSAI #A, the UE_A 10 may respond to the core network_B 190 without stopping the back-off timer associated with S-NSSAI #A.

In this manner, for the second congestion management, in reception of the network-initiated session management request message, the UE_A 10 may continue the congestion management although the UE_A 10 transmits a response message to the network-initiated session management request message to the core network_B 190. Thus, a state in which transmission of the UE-initiated session management request message regulated by the second congestion management is restrained may be continued.

Here, as described above, the network-initiated session management request message according to the present embodiment may be a PDU session modification command (PDU SESSION MODIFICATION COMMAND) message in the network-initiated PDU session modification procedure, or may be a PDU session release command (PDU SESSION RELEASE COMMAND) message in the network-initiated PDU session release procedure.

Further, as described above, a network-initiated session management complete message to respond to a PDU session modification command message according to the present embodiment may be a PDU session modification complete message (PDU SESSION MODIFICATION COMPLETE), and a network-initiated session management complete message to respond to a PDU session release command message according to the present embodiment may be a PDU session release complete message (PDU SESSION RELEASE COMPLETE). Further, in a case that the network-initiated session management request message is the PDU session modification command and/or the PDU session release message, the UE_A 10 and the core network_B 190 may be configured to perform further detailed processing to be described below in addition to the processing described above.

For example, in a case that the core network_B 190 includes information indicating a reactivation request (Reactivation Required) in the network-initiated session management request message to be transmitted, the core network_B 190 may perform processing as follows. Note that the information indicating a reactivation request (Reactivation Required) is information indicating that activation is requested, and may be a 5G session management cause value #39 (5GSM Cause #39) as a specific example.

In the following, the first processing and procedure example of a case that the information indicating a reactivation request is received will be described.

In a case that the UE_A 10 receives the network-initiated session management request message including the information indicating a reactivation request (Reactivation Required), the UE_A 10 waits for release of the congestion management and then initiates the UE-initiated PDU session establishment procedure again instead of initiating the UE-initiated PDU session establishment procedure again immediately after completion of the network-initiated session management procedure. Here, the UE-initiated PDU session establishment procedure may be a UE-initiated PDU session establishment procedure for the PDU session type, the SSC mode, the DNN, and the S-NSSAI, which is provided in the UE-initiated PDU establishment procedure in a case that a PDU session to be modified or released is established.

Note that to wait for release of the congestion management may be to perform after the timer associated with the second congestion management Expires. In other words, to wait for release of the congestion management may be to perform after completion of the count of the timer associated with the second congestion management and/or after the timer value associated with the second congestion management has reached zero.

Further, the UE_A 10 may include the following supplementary information in the network-initiated session management complete message.

The supplementary information may be information indicating awaiting timer expiration and/or information indicating a remaining timer value. Here, the timer may be the timer associated with the second congestion management. Further, to be awaiting timer expiration may be to perform after the timer has Expired. In other words, to wait for release of the congestion management may be to perform after completion of the count of the timer associated with the second congestion management and/or after the timer value associated with the second congestion management has reached zero.

Note that the core network B_190 may receive the network-initiated session management complete message including the supplementary information, and recognize a value of the remaining timer. Further, the core network B_190 may recognize that the UE-initiated PDU session establishment procedure is initiated after time of the value indicated by the remaining timer has passed.

Here, the remaining timer recognized by the core network_B 190 may be a value indicated by the received supplementary information, or may be a value obtained by taking an offset between transmission time of the network-initiated session management complete message of the UE_A 10 and reception time of the network-initiated session management complete message of the core network B 190 into consideration for a value indicated by the received supplementary information.

Further, not only limited to the first processing and procedure example of a case that the information indicating a reactivation request is received, as described below, the second processing and procedure example of a case that the information indicating a reactivation request is received may be performed.

As has been described in the above, for the second congestion management, in reception of the network-initiated session management request message, the UE_A 10 may continue the congestion management although the UE_A 10 transmits a response message to the network-initiated session management request message to the core network_B 190. Thus, although a state in which transmission of the UE-initiated session management request message regulated by the second congestion management is restrained continues, the UE_A 10 and/or the core network_B 190 may be configured to be allowed only for initiation of the UE-initiated PDU session establishment procedure again.

In other words, in a case that the UE_A 10 receives the network-initiated session management request message including the information indicating a reactivation request (Reactivation Required), the UE_A 10 initiates the UE-initiated PDU session establishment procedure again after completion of the network-initiated network-initiated session management procedure. Here, the UE-initiated PDU session establishment procedure may be a UE-initiated PDU session establishment procedure for the PDU session type, the SSC mode, the DNN, and the S-NSSAI, which is provided in the UE-initiated PDU establishment procedure in a case that a PDU session to be modified or released is established.

Note that, while application of the congestion management continues in the UE_A 10, the UE_A 10 and the core network B190 may perform and complete the procedures allowed as exception to the above, but initiation of other UE-initiated session management procedures restrained by the second congestion management may be restrained in the UE_A 10.

Further, not only limited to the first and second processing and procedure examples of a case that the information indicating a reactivation request is received, as described below, the third processing and procedure example of a case that the information indicating a reactivation request is received may be performed.

As has been described in the above, for the second congestion management, in reception of the network-initiated session management request message, the UE_A 10 transmits a response message to the network-initiated session management request message to the core network B 190. Further, in a case that the UE_A 10 receives the network-initiated session management request message including the information indicating a reactivation request (Reactivation Required), the UE_A 10 may stop application of the second congestion management.

In other words, in a case that the information indicating a reactivation request (Reactivation Required) is not included in the network-initiated session management request message, the UE_A 10 may continue the congestion management. In this case, a state in which transmission of the UE-initiated session management request message regulated by the second congestion management is restrained may continue.

Thus, in a case that the UE_A 10 receives the network-initiated session management request message including the information indicating a reactivation request (Reactivation Required), the UE_A 10 initiates the UE-initiated PDU session establishment procedure again after completion of the network-initiated network-initiated session management procedure. Here, the UE-initiated PDU session establishment procedure may be a UE-initiated PDU session establishment procedure for the PDU session type, the SSC mode, the DNN, and the S-NSSAI, which is provided in the UE-initiated PDU establishment procedure in a case that a PDU session to be modified or released is established.

Further, not only limited to the first, second, and third processing and procedure examples of a case that the information indicating a reactivation request is received, as described below, the information indicating a reactivation request may be configured not to be transmitted by the core network_B 190.

To be more specific, the core network_B 190 may be configured to restrain from including the information indicating a reactivation request (Reactivation Required) in a case that the core network_B 190 transmits the network-initiated session management request message to the UE_A 10 applying the congestion management.

Alternatively, the core network_B 190 may be configured to restrain from including the information indicating a reactivation request (Reactivation Required) in a case that the core network_B 190 transmits the network-initiated session management request message to the UE_A 10 applying the second congestion management.

The above has described the processing and procedures of the UE_A 10 and the core network B190. The processing of the core network_B 190 that has been described in this section may be, more specifically, processing performed in a control apparatus such as the SMF_A 230 and/or the AMF_A 240 which is the apparatus in the core network B 190. Thus, a case that the core network B190 transmits and/or receives a control message may refer to a case that the control apparatus such as the SMF_A 230 and/or the AMF_A 240 which is the apparatus in the core network_B 190 transmits and/or receives a control message.

Further, not only limited to this section but also in the expression used in the description of the present embodiment, to release application for the congestion management or stop the congestion management may include processing of stopping the back-off timer associated with the congestion management, and to continue application for the congestion management or continue the congestion management may include to continue the count of the back-off timer associated with the congestion management.

Further, in the above description, in the first, second, and third processing and procedure examples of the case that the information indicating a reactivation request described in this section is received, the UE_A 10 is for congested S-NSSAI #A and any DNN regarding the network-initiated session management request message and/or the network-initiated session management procedure.

In other words, the congested S-NSSAI #A and any DNN may be S-NSSAI #A and any DNN that are associated with the PDU session being a target of the network-initiated session management request message and/or the network-initiated session management procedure of this section.

Note that the UE_A 10 and the core network_B 190 may perform an anchor relocation procedure of SSC mode 2 including the procedure of this section, and may continue communication by switching to an anchor of a PDU session or a PDU session with a different anchor. Here, the anchor relocation procedure of SSC mode 2 is a procedure initiated by the core network_B 190, and a procedure performed along with transmission of the PDU session release command performed in the procedure may be any one of the procedures described in this section.

Further, the UE_A 10 and the core network_B 190 may perform an anchor relocation procedure of SSC mode 3 including the procedure of this section, and may continue communication by switching to an anchor of a PDU session or a PDU session with a different anchor. Here, the anchor relocation procedure of SSC mode 3 is a procedure initiated by the core network_B 190, and a procedure performed along with transmission of the PDU session modification command performed in the procedure may be any one of the procedures described in this section.

Next, processing of a case that the UE has performed movement along with change of the PLMN in a state in which the congestion management is applied will be described.

First, in the first processing example along with change of the PLMN, the UE may continue application of the congestion management along with the change of the PLMN regarding the UE, and transmission of the UE-initiated session management request message may be regulated also in the change destination PLMN.

In other words, the UE may be configured to continue the count of the timer associated with the congestion management along with the change of the PLMN, and not to perform transmission of the UE-initiated session management request message until the count of the timer expires also in the change destination PLMN. Here, the UE-initiated session management request message to be regulated may be a UE-initiated session management request message that is regulated based on a type of congestion management to be continuously applied. Note that the UE-initiated session management request message that is not to be regulated based on a type of congestion management to be continuously applied can be transmitted.

Next, in the second processing example along with the change of the PLMN, the UE continues application of the congestion management along with the change of the PLMN regarding the UE, but in the change destination PLMN, transmission of the UE-initiated session management request message may be allowed and able to be transmitted.

In other words, the UE continues the count of the timer associated with the congestion management along with the change of the PLMN, but in the change destination PLMN, transmission of the UE-initiated session management request message may be able to be performed regardless of whether or not the count of the timer expires. Here, the UE-initiated session management request message to be allowed may be a UE-initiated session management request message that is regulated based on a type of congestion management to be continuously applied. Note that the UE-initiated session management request message other than the UE-initiated session management request message to be regulated based on a type of congestion management to be continuously applied can be transmitted.

Next, in the third processing example along with the change of the PLMN, the UE stops application of the congestion management along with the change of the PLMN regarding the UE, and in the change destination PLMN, transmission of the UE-initiated session management request message may be allowed and able to be transmitted.

In other words, the UE may stop the count of the timer associated with the congestion management along with the change of the PLMN, and transmission of the UE-initiated session management request message may be able to be performed. Note that the UE-initiated session management request message to be allowed may be a UE-initiated session management request message that is regulated based on a type of the applied congestion management. Note that the UE-initiated session management request message other than the UE-initiated session management request message to be regulated based on a type of congestion management to be continuously applied can be transmitted.

Next, processing of selecting and/or determining the first to third processing examples along with the change of the PLMN described above will be described.

Here, the first to third processing examples along with the change of the PLMN described above may be determined according to a type of congestion management, or may be determined according to a cause value for rejecting the UE-initiated session management request message that the NW applies other than the congestion management. For example, in a case that the first congestion management is applied, processing may be performed based on the first processing example along with the change of the PLMN. Further, in a case that the second or third congestion management is applied, processing may be performed based on the second processing example along with the change of the PLMN. Further, in a case that the NW rejects the UE-initiated session management request message for a cause other than the congestion management, processing may be performed based on the first processing example along with the change of the PLMN. In this manner, different processing may be performed according to a type of congestion management indicated by the 15th identification information or a rejection cause other than the congestion management. Note that the processing example along with the change of the PLMN selected in each example described above is not limited to the examples, and it goes without saying that configuration so that any one of the first to third processing examples is selected may be adopted. Note that which of the processing examples along with the change of the PLMN is to be performed according to a type of congestion management or a rejection cause other than the congestion management may be configured in the UE in advance and may be determined based on the configuration information. Alternatively, information for selecting which of the processing examples along with the change of the PLMN according to a type of congestion management or a rejection cause other than the congestion management may be received from an application server included in the core network_B 190, the DN_A 5, or the DN_A 5 and may be determined based on the received information. The received information may include information indicating which of the processing examples along with the change of the PLMN is to be performed for the type of congestion management or the rejection cause other than the congestion management. For example, the information may be information indicating that the second processing example along with the change of the PLMN is to be performed for the second type of congestion management. Further, the information may be information indicating that the first processing example along with the change of the PLMN is to be performed for a rejection cause other than the congestion management.

Note that the information for selecting the processing example along with the change of the PLMN may be included in the registration accept message and/or the PDU session establishment accept message from the core network, or may be included in a Management Object (MO) received from the application server. Further, in a case that the second or third congestion management is applied, determination may be made not only according to the type of congestion management but also according to whether the S-NSSAI associated with the congestion management is standard information made to be common to the PLMNs or information specific to a communication operator different for each PLMN. To be more specific, determination may be made according to whether the SST and/or the SD configuring the S-NSSAI associated with the congestion management is standard information made to be common to the PLMNs (Standard Value) or information specific to a communication operator different for each PLMN (Non Standard Value).

In other words, such configuration may be adopted that different processing examples along with the change of the PLMN are performed for a case that the second or third congestion management is applied and further the S-NSSAI associated with the applied congestion management is the standard information made to be common to the PLMNs and a case that the second or third congestion management is applied and further the S-NSSAI associated with the applied congestion management is the information specific to a communication operator different for each PLMN.

For example, such configuration may be adopted that the first processing example is performed in a case that the second or third congestion management is applied and further the S-NSSAI associated with the applied congestion management is the standard information made to be common to the PLMNs and a case that the second processing example is performed and further the second or third congestion management is applied and further the S-NSSAI associated with the applied congestion management is the information specific to a communication operator different for each PLMN.

Note that the processing example along with the change of the PLMN selected in each example described above is not limited to the examples, and it goes without saying that configuration so that any one of the first to third processing examples is selected may be adopted.

Note that which of the processing examples along with the change of the PLMN is performed may be configured in the UE in advance and may be determined based on the configuration information. Alternatively, information for selecting which of the processing examples along with the change of the PLMN according to the S-NSSAI to be applied to the second or third congestion management may be received from an application server included in the core network_B 190, the DN_A 5, or the DN_A 5 and may be determined based on the received information. The received information may include information indicating which of the processing examples along with the change of the PLMN is to be performed for the S-NSSAI to be applied to the second or third congestion management. For example, the information may be information indicating that the first processing example along with the change of the PLMN is to be performed in a case that the S-NSSAI to be applied to the second type of congestion management is the standard information made to be common to the PLMNs. Further, the information may be information indicating that the second processing example along with the change of the PLMN is to be performed in a case that the S-NSSAI to be applied to the third type of congestion management is the information specific to a communication operator different for each PLMN. Processing may be performed based on the selected and/or determined processing of the first to third processing examples along with the change of the PLMN described above.

Note that, in the description above, the processing performed based on the selected and/or determined processing of the first to third processing examples along with the change of the PLMN described above is processing performed for change of any PLMN. However, this is not restrictive, and the processing may be processing that is applied in a case that the second PLMN after change is not an equivalent PLMN for the first PLMN before change. Further, in a case that the present processing is processing that is applied in a case that the PLMN is not an equivalent PLMN, regarding the processing applied in a case that the PLMN is an equivalent PLMN, the processing may be performed based on the first processing example along with the change of the PLMN.

2. MODIFIED EXAMPLES

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. Furthermore, in a case that a circuit integration technology that replaces the present integrated circuit appears with advances in semiconductor technology, one or more aspects of the present invention can also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

REFERENCE SIGNS LIST

1 Mobile communication system
5 DN_A
6 PDN_A
10 UE_A
20 UTRAN_A
22 NB_A
24 RNC_A
30 PGW_A
35 SGW_A
40 MME_A
45 eNB_A
50 HSS_A
80 E-UTRAN_A
90 Core network_A
120 NG-RAN_A
122 NR node_A
190 Core network_B
230 SMF_A
235 UPF_A
239 UPF_C
240 AMF_A

What is claimed is:

1. A User Equipment (UE), comprising:
a transmitter configured to determine whether to transmit, in a case that a first timer is running for a Single Network Slice Selection Assistance Information (S-NSSAI) at a time when a Public Land Mobile Network (PLMN) is changed, a Protocol Data Unit (PDU) session establishment request message for the same S-NSSAI in the changed PLMN without stopping the first timer,
wherein:
the PDU session establishment request message is transmitted to a core network associated with the changed PLMN,
the first timer and a second timer are associated with a priority management rule that is configured to the UE for managing a plurality of timers corresponding to a plurality of PDU sessions, and
in a case that overlapping congestion managements occur, the PDU session establishment request message is allowed to be transmitted based on the second timer, the second timer being indicated as having a higher priority than the first timer.

2. A communication method performed by a User Equipment (UE), the communication method comprising:
determining whether to transmit, in a case that a first timer is running for a Single Network Slice Selection Assistance Information (S-NSSAI) at a time when a Public Land Mobile Network (PLMN) is changed, a Protocol Data Unit (PDU) session establishment request message for the same S-NSSAI in the changed PLMN without stopping the first timer,
wherein:
the PDU session establishment request message is transmitted to a core network associated with the changed PLMN,
the first timer and a second timer are associated with a priority management rule that is configured to the UE for managing a plurality of timers corresponding to a plurality of PDU sessions, and
in a case that overlapping congestion managements occur, the PDU session establishment request message is allowed to be transmitted based on the second timer, the second timer being indicated as having a higher priority than the first timer.

* * * * *